(12) United States Patent  
Xiong et al.

(10) Patent No.: US 10,701,616 B2  
(45) Date of Patent: Jun. 30, 2020

(54) DATA TRANSMISSION METHOD, SENDING NODE, RECEIVING NODE, AND DATA TRANSMISSION SYSTEM

(71) Applicant: HUAWEI TECHNOLOGIES CO., LTD., Shenzhen, Guangdong (CN)

(72) Inventors: Tao Xiong, Shenzhen (CN); Kai Zheng, Beijing (CN); Yi Zeng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/005,664

(22) Filed: Jun. 11, 2018

(65) Prior Publication Data

US 2018/0295555 A1 Oct. 11, 2018

Related U.S. Application Data

(63) Continuation of application No. PCT/CN2016/096957, filed on Aug. 26, 2016.

(30) Foreign Application Priority Data

Dec. 14, 2015 (CN) .......................... 2015 1 0926077

(51) Int. Cl.
*H04W 40/12* (2009.01)
*H04L 12/801* (2013.01)
(Continued)

(52) U.S. Cl.
CPC .......... *H04W 40/12* (2013.01); *H04L 1/1671* (2013.01); *H04L 1/18* (2013.01); *H04L 1/1874* (2013.01);
(Continued)

(58) Field of Classification Search
CPC .... H04W 40/12; H04L 1/1671; H04L 1/1874; H04L 47/25; H04L 43/0829;
(Continued)

(56) References Cited

U.S. PATENT DOCUMENTS 6,526,022 B1 2/2003 Chiu et al.
8,583,977 B2 11/2013 Munson et al.
(Continued)

FOREIGN PATENT DOCUMENTS

CN 101023618 A 8/2007
CN 101179362 A 5/2008
(Continued)

OTHER PUBLICATIONS

ZetaTCP® Independent TCP Transmission Acceleration Technical White Paper Based on Intelligent Learning,Beijing Huaxia Innovation Technology Co., Ltd.,Appex Networks,dated Oct. 19, 2015,total 16 pages.

(Continued)

*Primary Examiner* — Thai Nguyen
(74) *Attorney, Agent, or Firm* — Huawei Technologies Co., Ltd.

(57) ABSTRACT

A data transmission acceleration method and related apparatuses are disclosed. A sanding node transmits a plurality of data packets to a receiving node at an initial transmission rate. Each data packet carries a random sequence number and a rolling sequence number. The random sequence number identifies a data part of the data packet, and the rolling sequence number indicates a transmission sequence of the data packet. The sending node receives a packet loss feedback from the receiving node. The packet loss feedback is generated after the receiving node detects a packet loss event according to a rolling sequence number of a received data packet. The sending node determines a random sequence (Continued)

number of a lost data packet based on the received packet loss feedback. The sending node retransmits a data packet corresponding to the determined random sequence number. The retransmitted data packet carries a new rolling sequence number.

16 Claims, 13 Drawing Sheets

(51) Int. Cl.
  *H04L 12/807* (2013.01)
  *H04L 12/825* (2013.01)
  *H04L 1/18* (2006.01)
  *H04L 1/16* (2006.01)
  *H04L 5/00* (2006.01)
  *H04L 12/26* (2006.01)

(52) U.S. Cl.
  CPC ........ *H04L 5/0055* (2013.01); *H04L 43/0829* (2013.01); *H04L 47/196* (2013.01); *H04L 47/25* (2013.01); *H04L 47/26* (2013.01); *H04L 47/27* (2013.01); *H04L 47/34* (2013.01); *H04L 1/188* (2013.01)

(58) Field of Classification Search
  CPC ....... H04L 5/0055; H04L 47/34; H04L 47/27; H04L 47/26; H04L 47/196; H04L 1/18; H04L 1/188
  See application file for complete search history.

(56) References Cited

U.S. PATENT DOCUMENTS

| | | |
|---|---|---|
| 2001/0055311 A1* | 12/2001 | Trachewsky .......... H04L 1/0003 370/445 |
| 2008/0101403 A1 | 5/2008 | Michel et al. |
| 2009/0201928 A1* | 8/2009 | Chen ..................... H04L 12/189 370/390 |
| 2013/0250853 A1 | 9/2013 | Eravelli et al. |
| 2014/0092802 A1* | 4/2014 | Sugimoto ............. H04L 12/417 370/312 |
| 2014/0181610 A1 | 6/2014 | Munson et al. |
| 2014/0201318 A1 | 7/2014 | Dajani et al. |

FOREIGN PATENT DOCUMENTS

| | | |
|---|---|---|
| CN | 102025717 A | 4/2011 |
| EP | 2461515 A1 | 6/2012 |

OTHER PUBLICATIONS

RFC 4077 A.B. Roach," A Negative Acknowledgement Mechanism for Signaling Compression",Estacado Systems, Network Working Group,dated May 2005,total 16 pages.

RFC 1323 V. Jacobson et al.,"TCP Extensions for High Performance",Network Working Group,dated May 1992,total 37 pages.

MPLS-VPN service—China Telecom,dated 2012,total 11 pages with 9 page English translation.

* cited by examiner

DATA TRANSMISSION METHOD, SENDING NODE, RECEIVING NODE, AND DATA TRANSMISSION SYSTEM

CROSS-REFERENCE TO RELATED APPLICATIONS

This application is a continuation of International Application No. PCT/CN2016/096957, filed on Aug. 26, 2016, which claims priority to Chinese Patent Application No. 201510926077.6, filed on Dec. 14, 2015. The disclosures of the aforementioned applications are hereby incorporated by reference in their entireties.

TECHNICAL FIELD

The present application relates to the field of communications technologies, and in particular, to a data transmission acceleration method and a related apparatus and system.

BACKGROUND

In network communication, how to ensure reliable and efficient data transmission in a network is always a research focus in the academic and industrial fields. Data transmission efficiency is directly related to network protocol performance. A throughput rate or transmission rate is one of important indicators for measuring the network protocol performance. In existing communications networks, the transmission control protocol (TCP) or the user datagram protocol (UDP) is generally used as a transport layer protocol. The TCP and the UDP are two most universal transport layer protocols of a TCP/IP model. According to statistics, currently more than 90% of global Internet data traffic is transmitted by using the TCP, whereas less than 10% of the global Internet data traffic is transmitted by using the UDP. Moreover, the proportion of the transmission by using TCP is still increasing continuously, and gradually, the TCP protocol even begins to be used to transmit multimedia data packets in multimedia applications that widely use the UDP protocol currently. However, the TCP transport protocol, that was designed more than twenty years ago, increasingly cannot meet requirements of rapidly developing high-speed network environment and new applications. For example, because of TCP mechanisms such as "double-window" congestion control or packet loss retransmission, when there is a packet loss or a delay in a network, a throughput rate of a TCP connection dramatically decreases, and bandwidth cannot be effectively used. Consequently, the TCP protocol cannot well support data transmission at a high throughput rate or transmission rate.

Aimed to overcome the TCP transmission rate problem, various network acceleration technologies emerge accordingly. These acceleration technologies may be basically classified into three types: a packet loss-based TCP acceleration technology, a delay-based TCP acceleration technology, and a learning-based TCP acceleration technology.

The loss-based TCP acceleration technology follows a mainstream manner in which by means of a packet loss, the TCP determines congestion and adjusts a transmission rate. Improvements of the loss-based TCP acceleration technology over a conventional TCP mainly lie in enlarging an initial congestion window (CNWD) and using a recovery manner more progressive than the conventional TCP to recover the CNWD after determining congestion by means of a packet loss, so as to reduce impact of the congestion on the rate. Although the improvements can really increase the rate in many situations, a packet loss may occur because of a non-congestion factor in many networks, especially in a wireless network. For example, a packet loss caused by a factor such as signal interference does not mean an occurrence of congestion. Therefore, in the loss-based TCP acceleration technology, using a packet loss as a congestion occurrence signal is very likely to cause mistakes. Consequently, the transmission rate is decreased, and bandwidth cannot be effectively used.

The delay-based TCP acceleration technology overcomes a main disadvantage of the loss-based TCP acceleration technology by using a delay change to determine a congestion degree and adjust a transmission rate accordingly. This mechanism is more in accordance with characteristics of a modern network, because a transmission rate can be lowered in time when stacking begins in a queue of a network node on which congestion occurs, so as to avoid worsening of the congestion and reduce or even avoid a packet loss. In addition, in the delay-based TCP acceleration technology, a packet loss is not considered as congestion, so as to maintain a relatively high rate when a non-congestion factor results in a packet loss. Therefore, compared with the loss-based TCP acceleration technology, the well-designed delay-based TCP acceleration technology has a significant improvement in the transmission rate. Even so, when a delay on a network path changes greatly, according to the delay-based TCP acceleration technology, a delay increase resulting from a non-congestion factor is incorrectly determined as congestion and congestion processing is performed. Consequently, an unnecessary reduction of the transmission rate is caused. For example, a delay of a wireless network including the mobile Internet changes frequently, and some network devices (especially security devices) may also sporadically introduce an extra delay in data packet processing.

The learning-based TCP acceleration technology uses a dynamic algorithm for network path feature self-learning. It observes and analyzes network features in real time based on every TCP connection, and adjusts the algorithm at any time according to the learned network features, so as to determine a congestion degree more accurately and determine a packet loss in a more timely manner, thereby processing congestion more properly and recovering a lost packet more quickly. In principle, this design overcomes a problem that a static algorithm cannot adapt to a network path feature change, and ensures that an acceleration effect remains effective in various different network environments with a frequently changed network delay and a frequently changed packet loss feature. However, in the learning-based TCP acceleration technology, a current network status needs to be learned by learning a historical record, and for a network with a random packet loss and large delay jitter, such learning/determining has no obvious advantage. Consequently, a network throughput rate/transmission rate is not significantly improved.

Summarizing the above, the throughput rate or transmission rate of an existing transport protocol still has large rooms for improvement. Although some acceleration algorithms may implement acceleration to an extent, a network development trend is that network traffic characteristics are more and more complex and unpredictable. Particularly, in a scenario of high delay, high packet loss rate, and high bandwidth-delay, network path feature continually changes. Therefore, an acceleration effect may be unstable, and adverse effects may even occur sometimes. Therefore, the throughput rate or transmission rate of a transport layer protocol in the prior art still needs to be improved.

SUMMARY

Embodiments of the present application provide a data transmission method, a transmit/receiving node, and a data transmission system, for improving data transmission rate.

To achieve the foregoing application objective, according to a first aspect, an embodiment of the present application provides a packet transmission method. The method includes: transmitting, by a sending node, multiple data packets to a receiving node at a preset transmission rate; after detecting one or more lost data packets according to a sequence number of a received data packet, sending, by the receiving node, packet loss feedback information to the sending node, so as to request to retransmit the lost data packet; and after receiving the packet loss feedback information, retransmitting, by the sending node, the lost data packet according to an indication in the packet loss feedback information. Different from a conventional TCP mechanism in which a data packet is sent with best effort, in the data transmission method in this embodiment of the present application, data packets are evenly sent at a specific rate. This can reduce a case in which data packets are instantly injected into a network and network congestion is caused. In addition, unlike the TCP, a phenomenon that a packet cannot be sent because of a limitation such as a send window or a congestion window is avoided, so that a data transmission rate and bandwidth utilization can be significantly improved.

In a first possible implementation manner, a data packet sent by the sending node carries a random sequence number (SEQ) and a rolling sequence number (PKT.SEQ), and the receiving node can detect a lost data packet according to a rolling sequence number of a received data packet. A PKT.SEQ is used to indicate a transmission sequence of the data packet, and is related only to the transmission sequence of the data packet. Therefore, the receiving node can quickly determine a lost packet according to PKT.SEQs of consecutively received data packets. In a double-SEQ mechanism, any lost data packet may be detected within a round trip time (RTT), and a delay is shorter compared with timeout retransmission used in the TCP.

According to the first possible implementation manner of the first aspect, in a second possible implementation manner, rolling sequence numbers of the multiple data packets transmitted by the sending node correspond to transmission sequences of the multiple data packets.

According to the first or the second possible implementation manner of the first aspect, in a third possible implementation manner, the retransmitted data packet carries a new rolling sequence number.

According to the first or the second possible implementation manner of the first aspect, in a fourth possible implementation manner, a random sequence number carried in the retransmitted data packet is the same as a random sequence number carried in the data packet transmitted for the first time, and a rolling sequence number carried in the retransmitted data packet is different from a rolling sequence number carried in the data packet transmitted for the first time.

According to the first aspect or any one of the foregoing implementation manners, in a fifth possible implementation manner, the packet loss feedback information includes sequence number information of the lost data packet, and the sequence number information may be specifically a random sequence number or a rolling sequence number. Alternatively, in a sixth possible implementation manner, the packet loss feedback information includes sequence number information of a data packet already received by the receiving node, such as a random sequence number or a rolling sequence number.

According to the first aspect or any one of the foregoing implementation manners of the first aspect, in a seventh possible implementation manner, the packet loss feedback information sent by the receiving node is a negative acknowledgement (NACK) control packet including a packet loss indication field, and the packet loss indication field is used to carry a rolling sequence number of the lost data packet. Correspondingly, after receiving the NACK control packet, the sending node determines the random sequence number of the lost data packet based on a rolling sequence number carried in the NACK control packet and based on a mapping relationship between a random sequence number and a rolling sequence number of a data packet sent by the sending node, and retransmits the lost data packet after assigning a new rolling sequence number to the determined lost data packet. Alternatively, in an eighth possible implementation manner, a packet loss indication field of a NACK control packet may be used to carry a random sequence number of a lost data packet, and the receiving node may query a table of a mapping relationship between a random sequence number and a rolling sequence number of a data packet according to a rolling sequence number of the lost data packet, so as to determine the random sequence number of the lost data packet, add the determined sequence number to the packet loss indication field, and feed back the packet loss indication field to the sending node.

According to the fifth or the seventh possible implementation manner of the first aspect, in a ninth possible implementation manner, the packet loss indication field of the NACK control packet includes a packet loss start field (START) and a packet loss end field (END). The packet loss start field and the packet loss end field are respectively used to indicate rolling sequence numbers of the first packet and the last packet of multiple consecutive lost data packets. Correspondingly, after receiving the NACK control packet, the sending node may determine the multiple consecutive lost data packets according to the packet loss start field and the packet loss end field in the NACK control packet, and retransmit the multiple consecutive lost data packets. The receiving node feeds back the multiple consecutive lost data packets to the sending node by using one NACK control packet, so as to reduce a quantity of NACK control packets, reduce network resources, and improve retransmission efficiency.

According to the first aspect or any one of the foregoing possible implementation manners of the first aspect, in a tenth possible implementation manner, a mapping relationship between a random sequence number and a rolling sequence number of a data packet is stored in the sending node in a form of a mapping table. Further, in an eleventh possible implementation manner, in a data packet transmission process, the sending node adds a mapping relationship between a random sequence number and a rolling sequence number of an already sent data packet to the mapping table, so as to dynamically update the mapping table.

According to the first aspect or any one of the foregoing possible implementation manners of the first aspect, in a twelfth possible implementation manner, the NACK control packet includes a release field (Release SEQ), and the release field is used to carry a random sequence number or a rolling sequence number of a data packet that is already received by the receiving node currently. Correspondingly, after receiving the NACK control packet, the sending node may release, from a sending buffer according to an indication in the release field, space occupied by the data packet already received by the receiving node. Further, the receiving node may also release in time a receiving buffer occupied by the already received data packet.

According to the first aspect or any one of the foregoing possible implementation manners of the first aspect, in a thirteenth possible implementation manner, the receiving node further periodically sends a PACK control packet, where the PACK control packet carries a random sequence number of a head of line (HOL) packet. The HOL packet includes a lost data packet not sensed by the sending node and/or a data packet lost again after being retransmitted. Correspondingly, after receiving the PACK control packet, the sending node retransmits a data packet corresponding to the random sequence number carried in the PACK control packet. A PACK control packet is periodically sent, and a random sequence number (SEQ) of an HOL packet in added to the PACK control packet. This can effectively resolve a problem that a receiving buffer is blocked because of a loss of a NACK control packet or a loss of a retransmitted data packet.

Further, according to the thirteenth possible implementation manner of the first aspect, in a fourteenth possible implementation manner, the PACK control packet may further include at least one of a data packet receiving rate or a data packet loss rate. Further, in a fifteenth possible implementation manner, the sending node adjusts an initial transmission rate according to the data packet receiving rate and/or the data packet loss rate included in the PACK, so that the initial transmission rate is adapted to the data packet receiving rate. A PACK control packet is periodically sent, so that the sending node can dynamically adjust a transmission rate, and cooperation between the sending node and the receiving node is more effective, thereby improving a data transmission rate. Optionally, the receiving node may add information such as a data packet receiving rate and/or a data packet loss rate to another separate control packet, and feed back the information to the sending node.

According to any one of the thirteenth to the fifteenth possible implementation manners of the first aspect, in a sixteenth possible implementation manner, a period for sending a PACK by the receiving node may be calculated by means of max(RTT/a, threshold) (1<a<6).

According to any one of the thirteenth to the sixteenth possible implementation manners of the first aspect, in a seventeenth possible implementation manner, after receiving the first data packet, the receiving node enables a PACK timer; and if the PACK timer times out, a PACK is sent.

According to the first aspect or any possible implementation manner of the first aspect, in an eighteenth possible implementation manner, the sending node establishes a UDP connection to the receiving node, and transmits data based on the UDP connection.

A second aspect of the embodiments of the present application further provides a sending node, including a protocol stack, and a processor, a storage, and a communications interface that are connected by using a bus. The protocol stack is configured to execute, under control of the processor, a process of the sending node in the first aspect or any possible implementation manner of the first aspect.

A third aspect of the embodiments of the present application further provides a node, including a protocol stack, and a processor, a storage, and a communications interface that are connected by using a bus. The protocol stack is configured to execute, under control of the processor, a process of the receiving node in the first aspect or any possible implementation manner of the first aspect. In first possible implementation manners of the second aspect and the third fourth aspect, the communications interface includes a transmitter circuit and a receiver circuit, and the protocol stack is specifically configured to: transmit a data packet by using the transmitter circuit, and receive the data packet by using the receiver circuit. In second possible implementation manners of the second aspect and the third aspect, the protocol stack is stored in the storage in a form of an executable program, which is executed by the processor so as to implement functions of the sending node and the receiving node.

A fourth aspect of the embodiments of the present application further provides a data transmission system, including the sending node in the second aspect and the receiving node in the third aspect.

A fifth aspect of the embodiments of the present application further provides a data transmission system, including a sending node and a receiving node. The sending node includes one or more functional units implementing a function of the sending node in the first aspect or any possible implementation manner of the first aspect; and the receiving node includes one or more functional units implementing a function of the receiving node in the first aspect or any possible implementation manner of the first aspect.

A sixth aspect of the embodiments of the present application further provides a computer readable storage medium, where the storage medium stores program code, and the program code is used to execute a method step described in the foregoing any aspect or a possible implementation manner of any aspect.

In any aspect of the embodiments of the present application or any implementation manner of any aspect, the data packet receiving rate is used to indicate a rate of receiving a data packet by the receiving node, or a rate of reading a data packet from the receiving buffer by the receiving node, or a rate of receiving a valid data packet by the receiving node, where the valid data packet herein refers to a non-redundant data packet. The sending buffer and the receiving buffer are respectively located in memories of the sending node and the receiving node. A random sequence number identifies a data packet identity or data part information so as to ensure that data is arranged in order in the sending buffer; and a rolling sequence number is used to indicate a sequence of transmitting a data packet by the sending node. A random sequence number is related to a data part of a data packet, and a rolling sequence number is related only to a transmission sequence of a data packet and is unrelated to a data part of a data packet.

According to the data transmission method, the apparatus, and the data transmission system provided in the embodiments of the present application, a sender pushes a data packet to a receiver at a specific transmission rate; and when detecting a lost packet, the receiver quickly "pulls" back the lost packet by means of quick in-stream retransmission, and releases a memory occupied by already received consecutive data packets. This can improve a network throughput rate/transmission rate in a network with a high delay and a high packet loss rate.

BRIEF DESCRIPTION OF DRAWINGS

The following briefly describes the accompanying drawings used in describing the embodiments.

DESCRIPTION OF EMBODIMENTS

The embodiments of the present application are described below with reference to the accompanying drawings.

Network architectures and service scenarios that are described in the embodiments of the present application are intended for more clearly describing the technical solutions provided in the embodiments of the present application, and impose no limitation on the technical solutions. Moreover, the technical solutions provided in the embodiments of the present application are also applicable to similar technical problems as the network architecture evolves and new service scenarios emerge.

Figure 1:
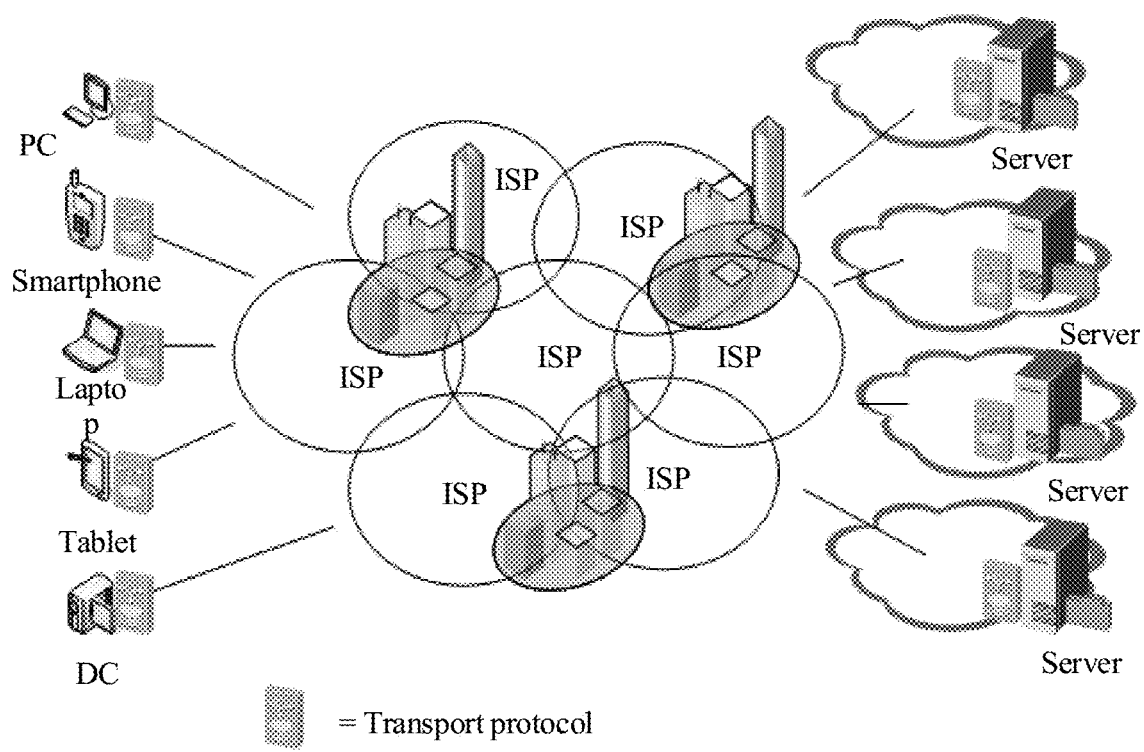
FIG. 1 is a schematic diagram of a typical application scenario in which the embodiments of the present application may be applied.

FIG. 1 is a schematic diagram of a typical application scenario to which the solutions of the present application are applicable. As shown in FIG. 1, in a scenario, a user equipment device (referred to as UE hereinafter) accesses the Internet by using an Internet service provider (ISP), and performs data transmission with a server based on a transport protocol. Data transmission includes, for example, downloading contents from the server and backing up local contents of the UE to the server. Generally, data transmission between the UE and the server may cross multiple regions and multiple ISPs, and therefore a high delay and a high packet loss rate are inevitable. In some other scenarios, data may be transmitted between UEs or servers by using a wired or wireless link, and there may also be a situation in which a data packet is lost because of factors such as a link. Therefore, for ensuring reliable data transmission, the transmission control protocol (TCP) becomes a first choice in transport protocols between different devices. However, a window-based mechanism such as the transmission mechanism, the congestion control mechanism, or the timeout retransmission mechanism introduced in the TCP for ensuring reliable data transmission imposes an extremely large limitation on a data transmission rate, and reduces link utilization. On the premise of ensuring reliable data transmission, this application aims to further improve a data transmission rate and improve link utilization. It may be understood that the technical solutions provided in the embodiments of the present application are applicable to all communications systems based on a TCP/IP reference model. The TCP/IP reference model is an abstract hierarchical model. Usually, the TCP/IP reference model is also referred to as a TCP/IP protocol stack. In this model, all network protocols are classified into five abstract "layers": a physical layer, a link layer, a network layer, a transport layer, and an application layer. Definitions of these layers can be found in the conventional art, and are not described herein.

The UE involved in this application may be a handheld device, a vehicle-mounted device, a wearable device, and a computing device that having communication functions. Typical examples include a personal computer, a smartphone, a laptop computer, a tablet computer, and a digital camera, as shown in FIG. 1. For ease of description, in this application, the devices mentioned above are collectively referred to as user equipment or UE. In the specification, claims, and accompanying drawings of the present application, the terms "first", "second", "third", "fourth", and so on (if existent) are intended to distinguish between similar objects, and do not necessarily indicate a specific order or sequence.

Figure 2:
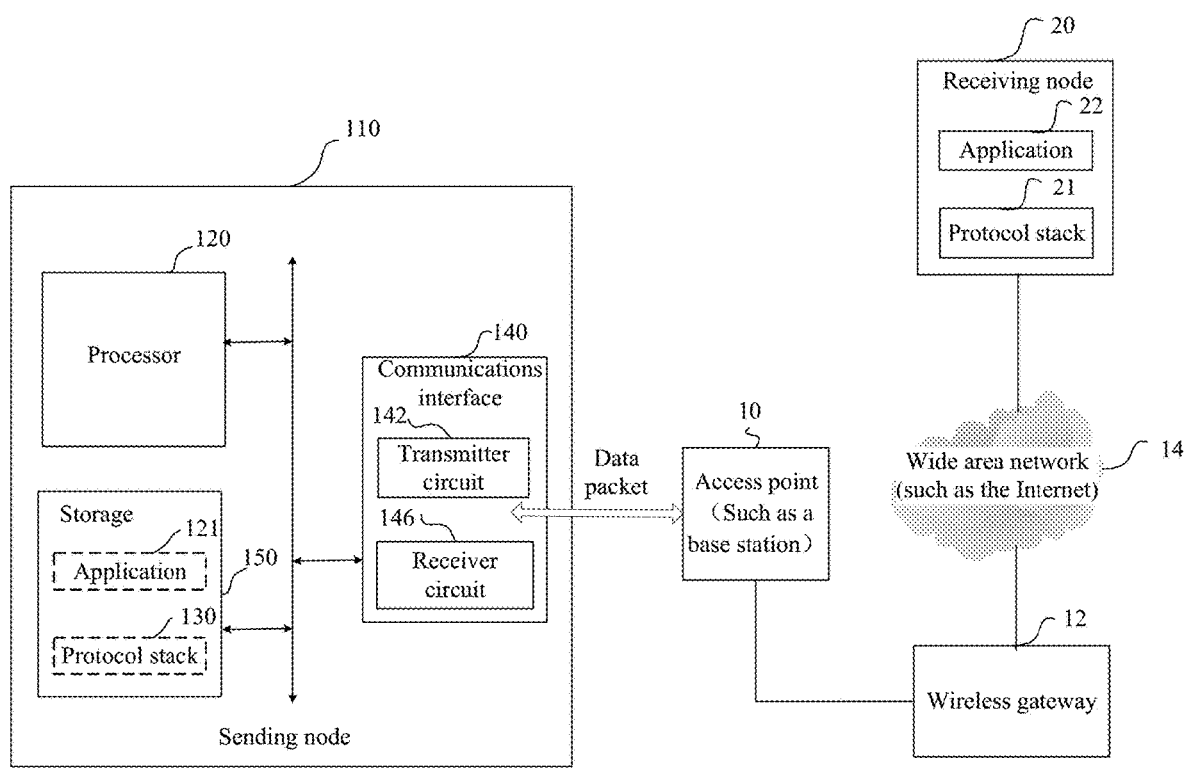
FIG. 2 is a block diagram of a data transmission system according to an embodiment of the present application.

FIG. 2 is a simplified block diagram of a data transmission system 100 provided in an embodiment of the present application. According to FIG. 2, the data transmission system 100 includes a sending node 110, an access point 10, a wireless access gateway 12, a wide area network 14, and a receiving node 20. A person skilled in the relevant art may understood that a data transmission system may generally include more or fewer components than the components shown in FIG. 2, or may include a component different from the components shown in FIG. 2. FIG. 2 shows only the components more related to multiple implementation manners disclosed in the embodiments of the present application.

The sending node 110 and the receiving node 20 may be independent physical devices or may be virtual machines. In a scenario, the sending node 110 may be the user equipment described above in relation to FIG. 1, and the receiving node 20 may be the server described in FIG. 1. In another scenario, roles of the user equipment and the server may be interchanged. That is, the server serves as the sending node, and the user equipment serves as the receiving node. Certainly, both the sending node 110 and the receiving node 20 may be user equipment or servers, and this is not specifically limited in the present application. The wide area network 14 may include a part of a public network, a private network, the Internet, and/or any combination thereof. The wireless access gateway 12 and the access point 10 may be included in a wireless network, and for brevity, other parts of the wireless network are not described. In addition, it should be further noted that in embodiments of the present application, network protocols deployed on the sending node and the receiving node are optimized to improve the data transmission rate, regardless of type of the network between the sending node and the receiving node. The data transmission, described in FIG. 2, between the sending node and the receiving node based on the wireless network is only a typical application scenario in the embodiments of the present application. It may be understood that a method provided in the embodiments of the present application can be used in scenarios in which data is transmitted between different devices by using a wired or wireless network. For example, in FIG. 1, data is transmitted between different UEs by using a wireless network (such as a Wi-Fi network and a cellular network), or data is transmitted between servers in a wired or wireless manner.

As shown in FIG. 2, the sending node 110 includes a processor 120, a communications interface 140, and a storage device 150. Correspondingly, the receiving node 20 also includes a processor, a communications interface, and a storage device (not shown in FIG. 2). The sending node 110 and the receiving node 20 further include a protocol stack 130 and a protocol stack 21 respectively. Functions of the protocol stacks 130 and 21 may be executed by an appropriate combination of software, hardware, and/or firmware. In addition, a person skilled in the art may understand that the sending node 110 and the receiving node 20 may include more or fewer components than the components shown in FIG. 2, and FIG. 2 shows only the components more related to multiple implementation manners disclosed in embodiments of the present application.

Figure 3:
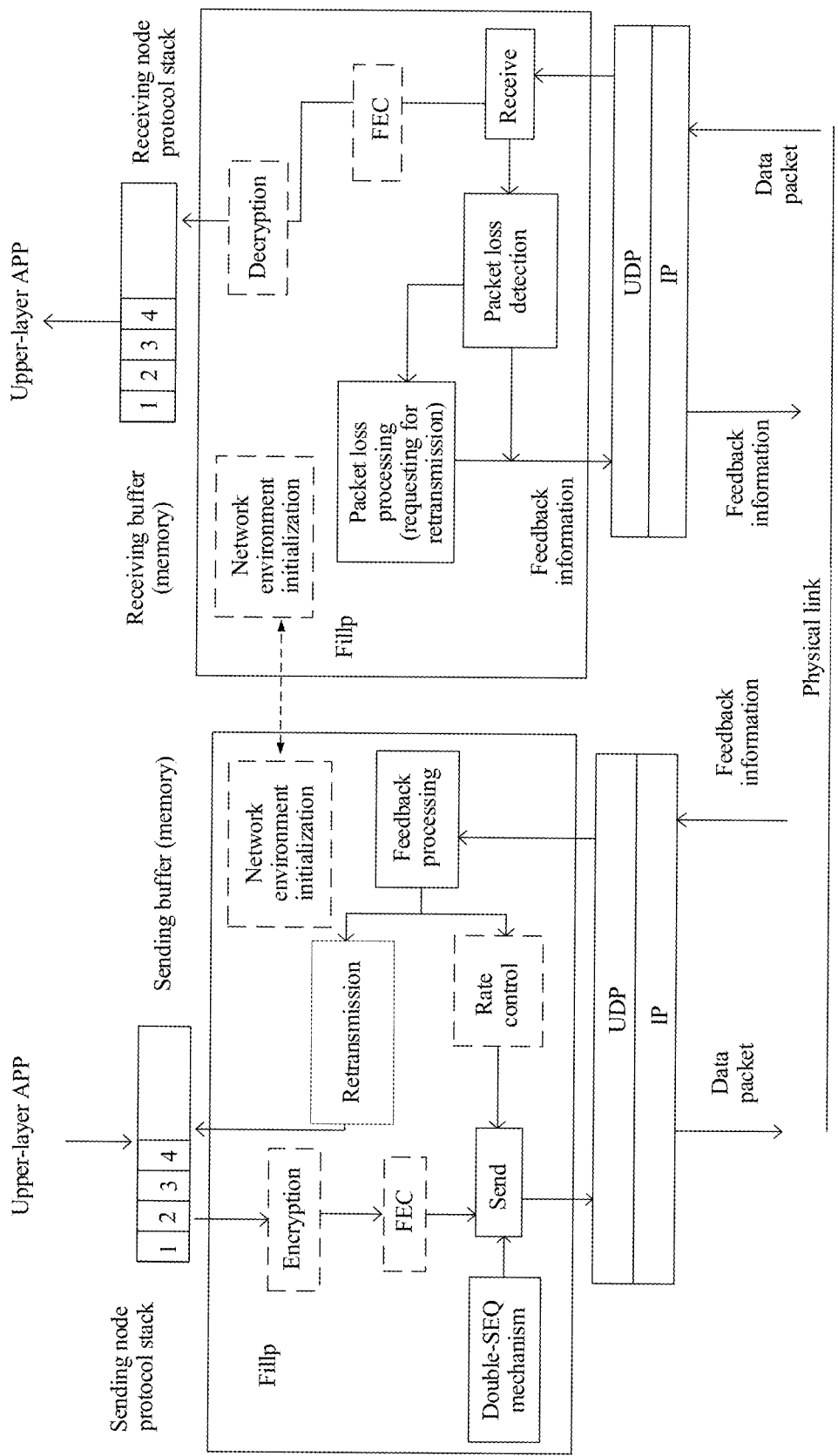
FIG. 3 is a working principle diagram of a protocol stack according to an embodiment of the present application.

The storage device 150 of the sending node 110 stores an application program 121 (or referred to as a sending application program). For example, the application program 121 may be a backup program used to upload contents destined to the receiving node 20, or may be a browser used to request contents from the receiving node 20. This is not specifically limited in the embodiments of the present application. The application program generally belongs to an application layer, and the processor 120 may read and execute the application program 121 stored in the storage device 150, so as to implement a specific function. Correspondingly, an application program 22 (or referred to as a receiving application program) runs on the receiving node 20. The application programs 121 and 22 may perform data transmission based on the protocol stacks 130 and 21. As shown in FIG. 3, the protocol stacks of the sending node 110 and the receiving node 20 include at least a network layer protocol (IP) and a transport layer protocol (UDP is selected in the embodiments of the present application, for example).

Figure 4:
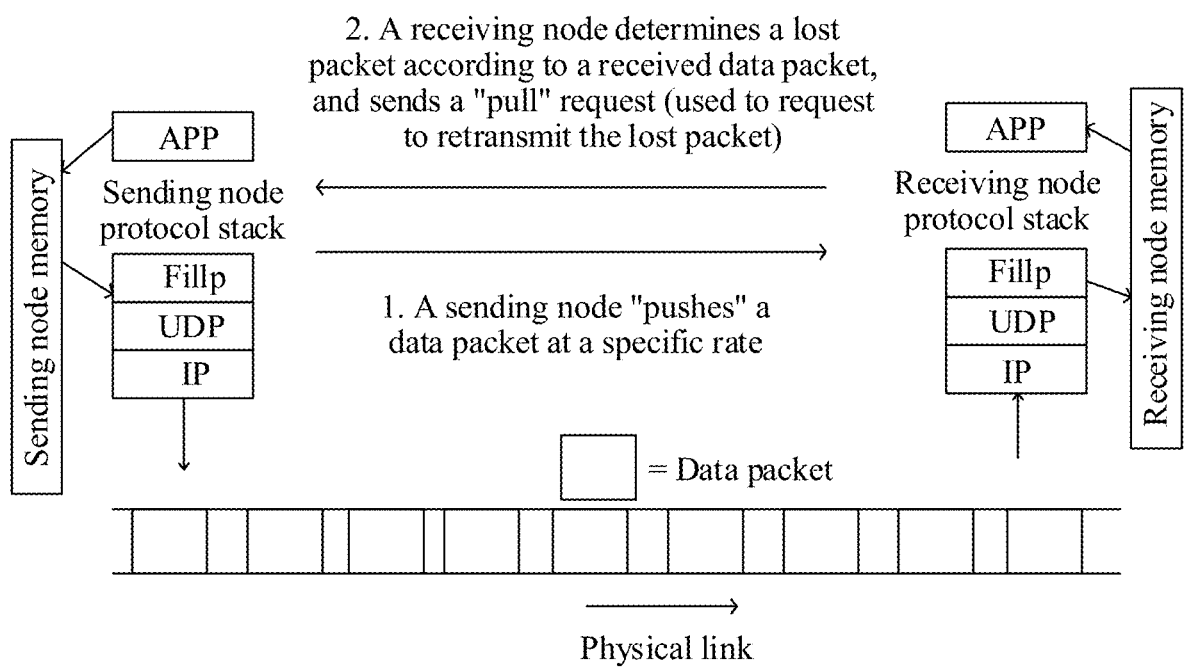
FIG. 4 is a schematic diagram of a data transmission method according to an embodiment of the present application.
Figure 5:
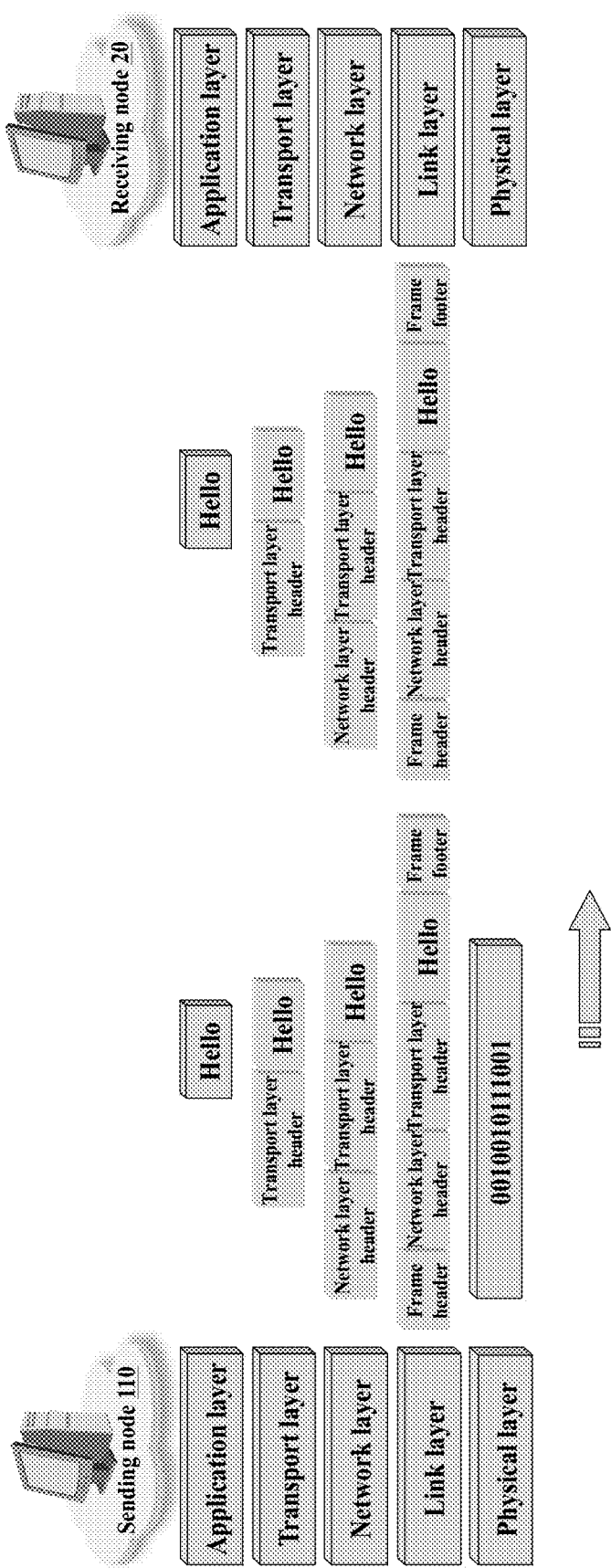
FIG. 5 is a working principle diagram of a protocol stack according to another embodiment of the present application.

Further, as shown in FIG. 3, the protocol stacks of the sending node and the receiving node in the data transmission system in the embodiments of the present application further include an acceleration protocol Fillp, which is used to provide a data transmission acceleration capability. As shown in FIG. 4, the Fillp on the sending node is mainly used to encapsulate a data packet of an upper-layer application program, and then constantly "push" the data packet from a memory to the receiving node at a stable transmission rate. The Fillp on the receiving node is mainly used to detect a lost data packet, and send a "pull" request so as to instruct the sending node to retransmit the lost data packet. The Fillp may be typically carried on the UDP. After being processed by the Fillp on the sending node, a data packet is successively transmitted to the underlying UDP and IP for encapsulation, and is finally sent by using a link on the physical layer. Correspondingly, after the receiving node receives the data packet from the physical link, the IP and the UDP decapsulate the data packet, and then transmit the data packet to the Fillp for processing. Then, the data packet is written to a memory of the receiving node and is finally submitted to the upper-layer application program. A process of performing encapsulation and decapsulation on a packet by the protocol stacks of the sending node 110 and the receiving node 20 is shown in FIG. 5. It can be seen from FIG. 5 that a packet encapsulation process is essentially a process of adding a header and/or a frame trailer to a packet according to a specification of each layer protocol of the protocol stack. A packet decapsulation process is essentially a process of removing a header and/or a frame trailer from a packet according to the specification of each layer protocol of the protocol stack.

More specifically, according to FIG. 3, on a side of the sending node, the Fillp protocol mainly implements data packet encapsulation on the application layer, data packet transmission based on a specific rate, and retransmission based on packet loss feedback information of the receiving node. On a side of the receiving node, the Fillp protocol mainly implements functions of data packet decapsulation, packet loss detection, and packet loss processing. Optionally, the Fillp protocol may further include at least one of the following functions: transmission rate control based on the feedback information of the receiving node, data packet encryption/decryption, network environment initialization, or forward error correction (FEC). For function implementation details of the acceleration protocol Fillp, refer to subsequent embodiments. It may be understood that in an embodiment, as shown in FIG. 3, the Fillp may be located above the transport layer. In another embodiment, the Fillp acceleration capability may be used as an extension of a transport layer protocol (such as the UDP) and be integrated into the transport layer protocol. The Fillp acceleration capability may further be implemented on the application layer in a form of an application program or an application program plug-in. Or, the Fillp acceleration capability may even be located between the physical layer (a network adapter) and the network layer (IP). This is not specifically limited in embodiments of the present application.

Figure 6:
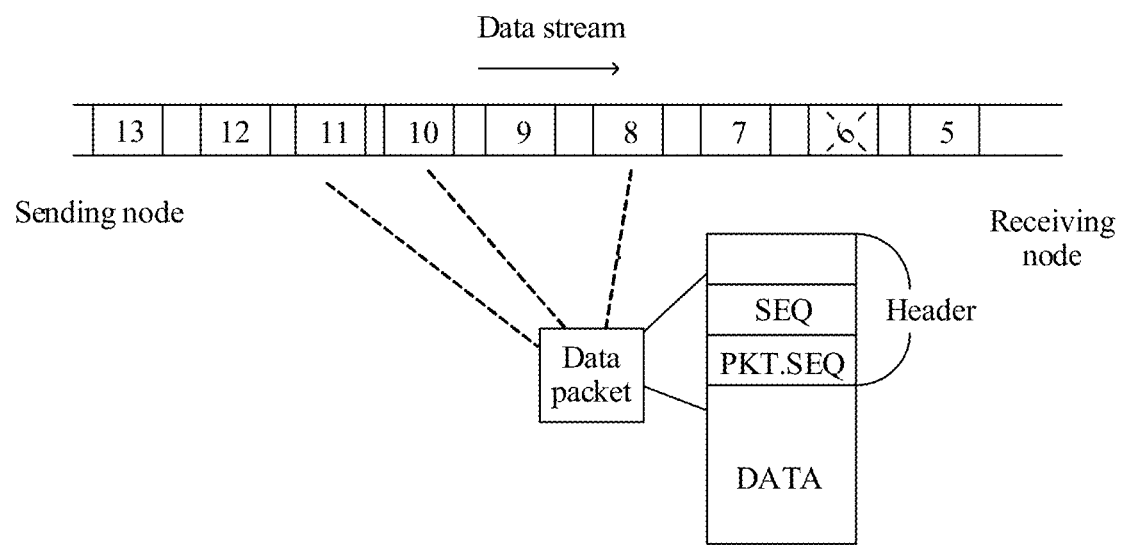
FIG. 6 is a schematic diagram of a double-sequence-number mechanism according to an embodiment of the present application.

As shown in FIG. 3, in an embodiment, after the sending node and the receiving node complete network environment initialization, a connection is established (a UDP connection is used as an example for description in this embodiment of the present application). An application program running on the sending node writes data to a sending buffer, and the sending buffer is generally a memory of the sending node or a part of the memory. The Fillp uses a double-sequence-number mechanism to encapsulate a data packet of the application program, transmits the data packet to the underlying UDP protocol and IP protocol for encapsulation, and then sends the data packet to the receiving node by using a physical link on the physical layer. Specifically, as shown in FIG. 6, each data packet includes a header and a data part. The header includes two sequence numbers: a random sequence number (represented by SEQ) and a rolling sequence number (represented by PKT.SEQ). The same as a sequence number of a header in a TCP data packet, the random sequence number (SEQ) is used to identify a data packet (i.e. information of a data part) so as to ensure that data is arranged in order in the sending buffer. For example, similar to the sequence number of the header in a TCP packet, the random sequence number may be a 32-byte non-symbol value. Generally, after a connection is established, a random sequence number of the first data packet sent by the sending node is generated by the sending node randomly. A random sequence number of a subsequent data packet may be increased or decreased, on the basis of the random sequence number of the first data packet, according to a data part length (a quantity of occupied bytes) of the data packet. Or, a random sequence number of a data packet may be generated according to data part content of the data packet by using a specific algorithm (such as a hash algorithm or a message-digest algorithm). The rolling sequence number corresponds to a sequence (or may be equal to a quantity of data packets already sent by the sending node) of transmitting the data packet by the sending node. For example, if the sending node has sent n data packets currently, a rolling sequence number of a next data packet to be sent by the sending node may be n+1, n+2, or another value in a line relationship or a monotonic function relationship with n. In a same connection or a same session, a rolling sequence number of each data packet transmitted by the sending node is unique, and rolling sequence numbers of multiple data packets consecutively sent by the sending node should be a monotonic increasing sequence, a monotonic decreasing sequence, or a geometric sequence. It should be noted that in this embodiment of the present application, a random sequence number is related to a data part of a data packet, and if data parts of two data packets are the same, random sequence numbers of the two data packets are the same. For example, a random sequence number of a data packet is N, regardless of whether the data packet is transmitted for the first time or retransmitted, the random sequence number of the data packet is constant. A rolling sequence number is related only to a transmission sequence of a data packet and is unrelated to a data part of the data packet. That is, in a same connection or a same session, a rolling sequence number of each data packet is unique, and a rolling sequence number of a data packet is in a monotonic function relationship with the transmission sequence. In this way, in the first transmission and retransmission, a random sequence number of a data packet is constant, but a rolling sequence number changes. In addition, the Fillp on a side of the receiving node may quickly detect a lost data packet according to a rolling sequence number of a received data packet, and feed back packet loss information to the sending node, so as to request the sending node to quickly retransmit the lost data packet. In an embodiment, the above described double-sequence-number mechanism may be applied to an existing TCP, so as to resolve a packet loss detection problem in the TCP, and in particular, a retransmitted packet loss detection problem. Further, in another embodiment, the Fillp on the side of the receiving node may feed back information such as a receiving rate and a data packet loss rate to the sending node, so that the sending node adjusts a transmission rate.

In the data transmission system in this embodiment of the present application, a conventional "window"-based transmission mechanism and a lost packet timeout retransmission mechanism in the TCP are not used. Instead, a memory of a sending node is used as a sending buffer, and the sending node "pushes" a data packet from the memory to a receiving node at a constant speed. The receiving node releases in time a sending buffer occupied by already received consecutive data packets, and sends a "pull" request when detecting a lost packet, so that the sending node retransmits the lost packet. The mechanism in which the sending node actively "pushes" a data packet and the receiving node "pulls" a lost packet according to the "pushed" data may tolerate a packet loss in a link, so as to avoid congestion and rate adjustment, and achieve a high throughput rate and a high transmission rate in the link.

Figure 7:
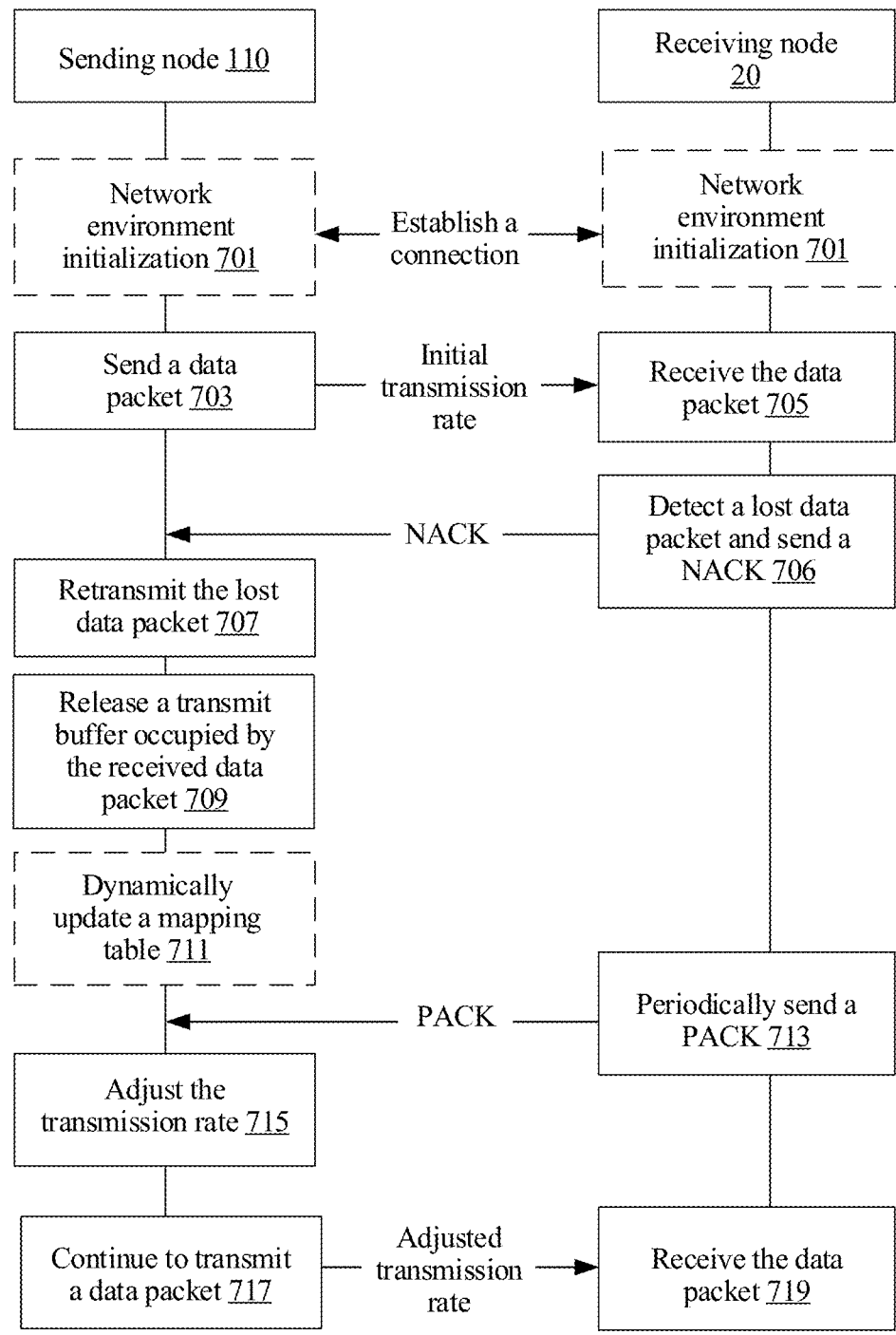
FIG. 7 is a flowchart of a data transmission method according to an embodiment of the present application.

Based on the basic framework and principle of the acceleration protocol Fillp described in the foregoing embodiment, the following embodiment of the present application describes a method for transmitting data in a data transmission system after a Fillp protocol is deployed. As shown in FIG. 7, the method mainly includes the following steps.

Step 703: Based on a connection (for example, a UDP connection) established between a sending node and a receiving node, the sending node transmits multiple data packets to the receiving node at an initial transmission rate, where each data packet carries two sequence numbers: a random sequence number and a rolling sequence number. For definitions and implementation of the random sequence number and the rolling sequence number, refer to the description in related embodiments of FIG. 5 and FIG. 6, and details are not described again. It should be noted that in the TCP, a data packet is sent based on a window, and all data packets within the window are fully sent with best effort. Consequently, it is probably that a large quantity of data packets are instantly packed on a network, and an instant congestion problem is caused. However, in the data transmission method in this embodiment of the present application, data packets are evenly sent at a specific rate. This can reduce a case in which data packets are instantly injected into a network. In addition, unlike the TCP, a phenomenon that a packet cannot be sent because of a limitation such as a send window or a congestion window is avoided, so that a data transmission rate and bandwidth utilization can be significantly improved.

In an embodiment, the initial transmission rate of the sending node may be configured by a user using a user interface, a script, or a configuration file. In another embodiment, the initial transmission rate may be automatically configured by the sending node according to network bandwidth between the sending node and the receiving node. Provided that there is a to-be-sent data packet in a sending buffer of the sending node, the sending node keeps using the initial transmission rate to transmit a data packet in the sending buffer, until a transmission rate adjustment instruction is received.

Step 705: The receiving node receives the multiple data packets.

In an embodiment, a rate of receiving a data packet by the receiving node matches the initial transmission rate of the sending node, for example, the two are equal or similar. In an embodiment, when a receiving rate of the receiving node is greater than or less than the initial transmission rate of the sending node, control information may be fed back to the sending node, so that the sending node adjusts the initial transmission rate to make the initial transmission rate match the receiving rate of the receiving node.

Step 706: The receiving node detects one or more lost data packets according to sequence numbers carried in one or more received data packets, generates packet loss feedback information according to information about the detected lost data packet, and sends the packet loss feedback information to the sending node.

In an embodiment, the receiving node may quickly detect a lost packet according to a rolling sequence number PKT.SEQ of a received data packet. For example, after the receiving node receives a data packet whose rolling sequence number PKT.SEQ is 3, if a data packet whose PKT.SEQ is 1 is received, but a data packet whose PKT.SEQ is 2 is not received, it is determined that the data packet whose PKT.SEQ is 2 is lost. Compared with the conventional TCP in which a packet loss needs to be determined by using multiple ACKs, the method in this embodiment of the present application is more efficient.

In an embodiment, the receiving node adds a random sequence number or a rolling sequence number of the detected lost data packet to an ACK packet, and sends the ACK packet to the sending node.

Figure 8:
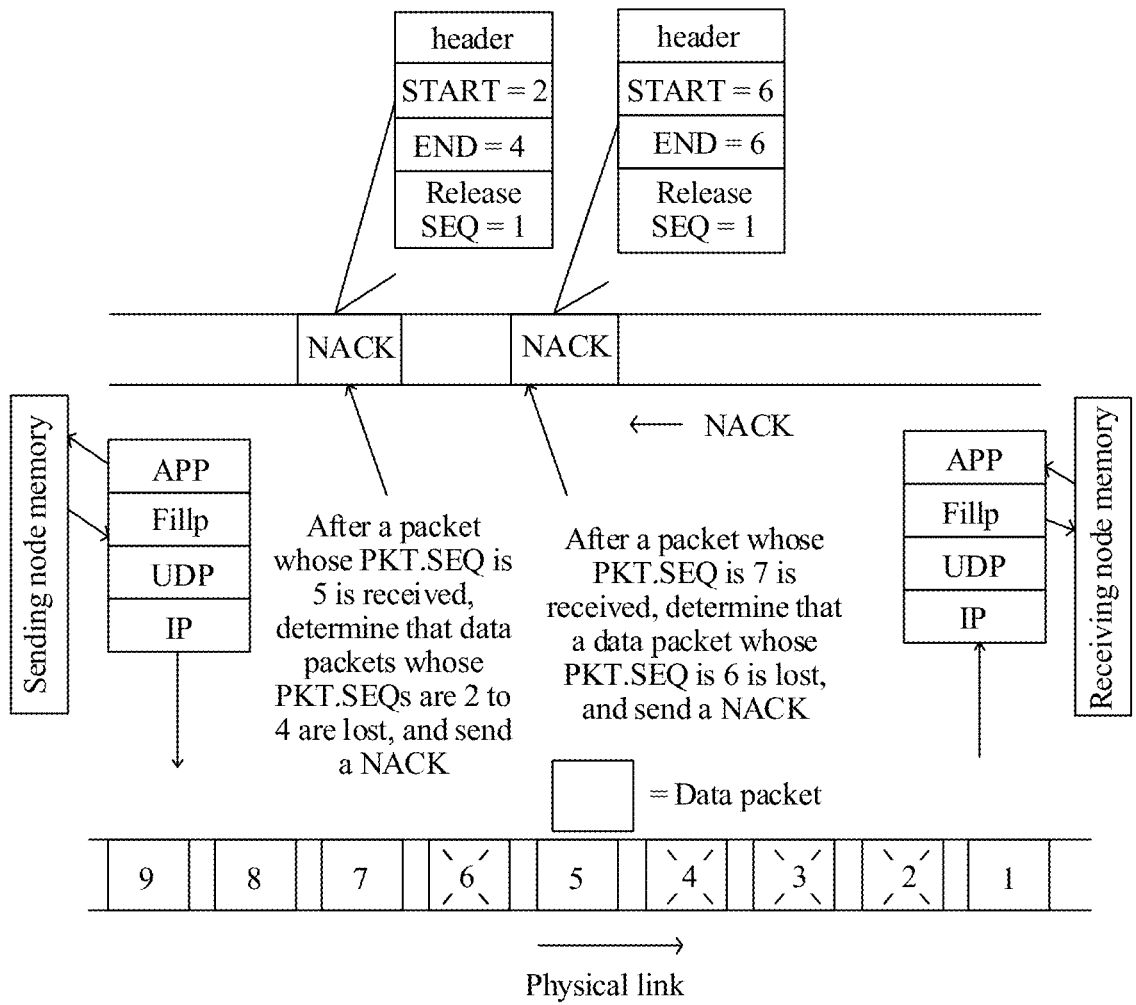
FIG. 8 is a schematic diagram of a NACK control packet according to an embodiment of the present application.

In another embodiment, the receiving node adds a sequence number of the detected lost data packet to a NACK (Negative Acknowledge) control packet (NACK for short below), and sends the NACK control packet to the sending node. Specifically, in a possible implementation manner, the NACK includes a packet loss indication field, and the field is used to carry a rolling sequence number of a lost data packet. For example, if the receiving node determines, according to a sequence number of a data packet that is already received currently, that a data packet whose PKT.SEQ is 2 is lost, the packet loss indication field of the NACK is immediately filled with 2, and the NACK is sent to the sending node. In another possible implementation manner, as shown in FIG. 8, the NACK may include a packet loss start field START and a packet loss end field END. The packet loss start field START and the packet loss end field END are respectively used to carry rolling sequence numbers of the first packet and the last packet of multiple consecutive lost packets. It may be understood that a rolling sequence number of a data packet increases according to a transmission sequence. Therefore, if the receiving node detects multiple consecutive lost packets, the packet loss start field and the packet loss end field respectively indicate a data packet with a largest rolling sequence number and a data packet with a smallest rolling sequence number in the multiple consecutive lost packets. If the receiving node only detects a single lost data packet currently, in the constructed NACK, values of the START and END fields are the same, and both are a rolling sequence number of the lost data packet. As shown in FIG. 8, when the receiving node receives a data packet whose PKT.SEQ is 1 and then receives a data packet whose PKT.SEQ is 5, it is determined that three data packets whose PKT.SEQs are 2 to 4 are consecutively lost, and a NACK in which START is 2 and END is 4 is constructed, so as to request the sending node to retransmit the consecutive lost data packets. When the receiving node continues to receive a data packet whose PKT.SEQ is 7, it is determined that a data packet whose PKT.SEQ is 6 is lost, and therefore a NACK in which START is 6 and END is 6 is constructed and sent to the sending node. It can be seen that by using the START and END fields, multiple consecutive lost data packets may be fed back to the sending node by using one NACK control packet, so as to reduce a quantity of NACK control packets, reduce network resources, and improve retransmission efficiency. In another possible implementation manner, the packet loss indication field included in the NACK may also carry a random sequence number of a lost data packet. For example, if the receiving node determines, according to a rolling sequence number (PKT.SEQ) of a data packet that is already received currently, that a data packet whose PKT.SEQ is 2 is lost, the receiving node determines, according to a mapping relationship between a random sequence number and a rolling sequence number of the data packet, the random sequence number corresponding to the lost data packet. The receiving node fills the determined random sequence number into the packet loss indication field of the NACK, and sends the NACK to the sending node, so that the sending node retransmits the corresponding data packet according to an indication in the packet loss indication field of the NACK.

Step 707: The sending node retransmits the lost data packet according to an indication in the received packet loss feedback information.

In an embodiment, the sending node determines a random sequence number of a lost data packet based on a rolling sequence number carried in the received NACK and based on a mapping relationship between a random sequence number and a rolling sequence number of a data packet transmitted by the sending node. Then, according to the determined random sequence number, the corresponding data packet is found from the sending buffer and is retransmitted. The retransmitted data packet carries an original random sequence number and a new rolling sequence number. In this case, the sending node usually records a mapping relationship between a random sequence number and a rolling sequence number of a data packet. For example, the sending node stores a mapping relationship between a random sequence number and a rolling sequence number of an already transmitted and/or to-be-transmitted data packet in a form of a hash table, so that when a NACK is received subsequently, a corresponding lost data packet is determined according to a rolling sequence number carried in the NACK.

In another embodiment, the sending node may determine a lost data packet according to a sequence number, which is carried in an ACK packet received by the receiving node, of a data packet already received by the receiving node, and retransmit the lost data packet.

Further, in an embodiment, a NACK further includes a release field (Release SEQ), and the release field is used to indicate a random sequence number and/or a rolling sequence number of a data packet that is already received by the receiving node currently. As shown in FIG. 8, when the receiving node receives a data packet whose PKT.SEQ is 5, it is determined that three data packets whose PKT.SEQs are 2 to 4 are lost, and a greatest PKT.SEQ of a data packet already received before a packet is lost is 1. Therefore, a value filled into the Release SEQ field is 1, so as to instruct the sending node to release a sending buffer occupied by a data packet whose PKT.SEQ is 1. Further, assuming that the receiving node detects that a data packet whose PKT.SEQ is 6 is lost, if retransmitted data packets (the three data packets previously determined as the lost data packets) whose PKT.SEQs are 2 to 4 are received, a NACK whose Release SEQ field value is 5 is constructed, so as to instruct the sending node to release a sending buffer occupied by data packets whose PKT.SEQs are 2 to 5. Correspondingly, in this embodiment, the sending node further executes step 709: Release, from a sending buffer according to a Release SEQ field in a received NACK, space occupied by a data packet indicated by the Release SEQ field. The sending buffer is generally a memory of the sending node or a part of the memory.

It should be noted that in all embodiments of the present application, a lost data packet refers to a lost data packet determined by the receiving node according to information about an already received data packet. Because of an unpredictable factor in network transmission, the lost data packet determined by the receiving node may not be lost actually, that is, the receiving node may "make a mistake", but the mistake does not actually affect an effect of the present application. Optionally, after receiving the packet loss feedback information, the sending node may not immediately retransmit the lost data packet, and may wait for a while, so as to reduce impact of a "mistake" resulting from disorderly received packets, where the waiting time may be configured by a user.

Figure 9:
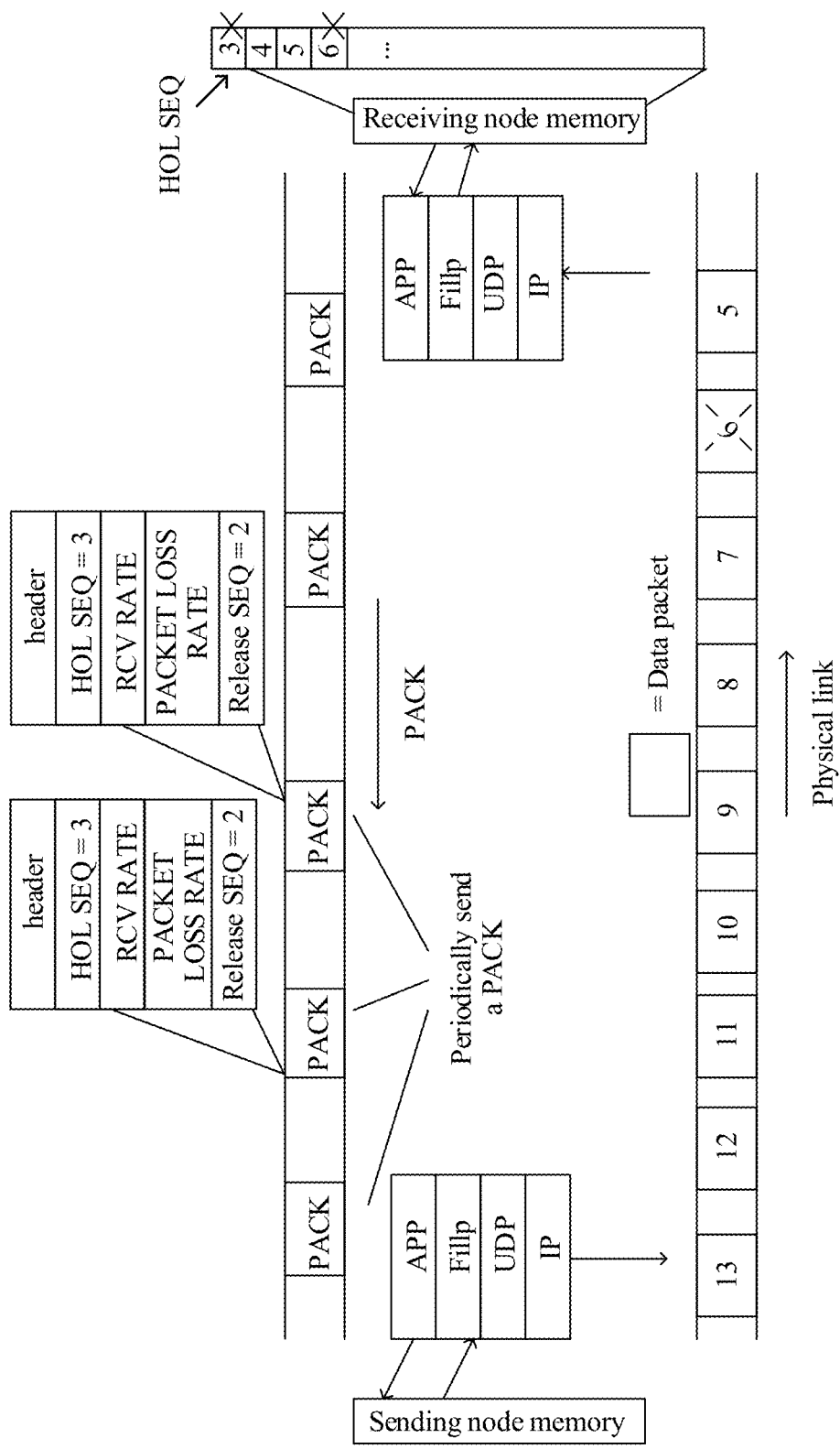
FIG. 9 is a schematic structural diagram of a PACK control packet according to an embodiment of the present application.

It can be seen from the foregoing description that in the foregoing embodiment of the present application, a lost data packet is quickly detected by using a rolling sequence number of a data packet, and after the lost data packet is detected, packet loss feedback information is sent to a sending node, so as to request to retransmit the lost data packet in time. Because of a sequence-preserving requirement during data packet transmission and submission to an upper-layer application program, if a data packet is not received by a receiving node, a received data packet subsequent to the data packet must be stored in a receiving buffer until the data packet is retransmitted and received by the receiving node. Then, the subsequent data packet is submitted to the application program, and the receiving buffer occupied by the subsequent data packet is released. That is, if data in the receiving buffer is inconsecutive (that is, there is a missed data packet in the receiving buffer), the receiving buffer cannot be released in time. However, in some cases, for example, because of link congestion and another reason, the packet loss feedback information sent by the receiving node is lost in a transmission process, or a lost data packet retransmitted by the sending node is lost again, and the receiving node cannot receive the lost data packet for a long time. Missing of the data packet in the receiving buffer leads to inconsecutive data, and consequently, another data packet in the receiving buffer cannot be released for a long time, and the receiving buffer is blocked. The data packet missed in the receiving buffer, that is, the data packet causing a blocked receiving buffer (typically, a data packet not received by the receiving node and not sensed by the sending node as a lost data packet, and a data packet lost again after being retransmitted) is generally referred to as an head of line (HOL) packet. A phenomenon that a receiving buffer is blocked by an HOL packet is generally referred to as an HOL effect. For resolving a problem that a receiving buffer is blocked by an HOL packet, the data transmission method in this embodiment of the present application further includes:

Step 713: The receiving node periodically sends a PACK (Period ACK) control packet (PACK for short below) to the sending node. As shown in FIG. 9, the PACK includes an HOL SEQ field, and the field is used to carry random sequence number information of an HOL packet. Specifically, after the receiving node detects a lost data packet and sends packet loss feedback information to the sending node, if the lost data packet is still not received within a specified time interval or when a PACK timer times out, it is determined that the lost data packet is an HOL packet, and random sequence number information of the HOL packet is added to a next PACK to be sent. The time interval herein may be one RTT, or may be a value set by a user according to an actual requirement. The receiving node fills a random sequence number of the HOL packet into an HOL SEQ field of the PACK. In this way, after receiving the PACK, the sending node may retransmit the HOL packet according to an indication in the HOL SEQ field. The PACK is periodically sent, and therefore, even if a PACK is lost, information about the HOL packet can still be fed back to the sending node by using a subsequent PACK, so that the foregoing problem that a receiving buffer is blocked by an HOL packet is well resolved. In an embodiment, a period for sending a PACK by the receiving node may be calculated by means of max(RTT/a, threshold) (1<a<6). The RRT is Round Trip Time in full name, and refers to a time during which a data packet is transmitted once between the sending node and the receiving node in a round-trip manner. In addition, the threshold herein may be set by a user, and the threshold is set to 15 ms in this embodiment of the present application. Certainly, the calculation formula herein is only a typical example. The period may be defined by a person skilled in the art according to an actual requirement, and is not limited to the formula. Further, after receiving the first data packet, the receiving node may enable a PACK timer, and a period of the timer may be set according to the above described method. When the timer times out, the receiving node sends a PACK, resets the timer, and restarts timing.

Optionally, as shown in FIG. 9, in an embodiment, each PACK carries a data packet receiving rate and/or a data packet loss rate. The data packet receiving rate is used to indicate a rate of receiving a data packet by the receiving node, or a rate of reading a data packet from the receiving buffer by the receiving node, or a rate of receiving a valid data packet by the receiving node, where the valid data packet herein refers to a non-redundant data packet. The data packet loss rate is a data packet loss ratio counted by the receiving node, and is used to indicate a network status within a period of time. Correspondingly, the data transmission method in this embodiment of the present application further includes:

Step 715: The sending node adjusts the initial transmission rate according to the received PACK, so that the initial transmission rate is adapted to a data packet receiving rate indicated by the PACK.

Step 717: The sending node continues to transmit a data packet to the receiving node based on an adjusted transmission rate.

Step 719: The receiving node receives the data packet and repeats the foregoing steps 706 to 715.

Optionally, as shown in FIG. 9, in an embodiment, the PACK further includes a release field (Release SEQ), a specific meaning of the field is the same as that of the Release SEQ field in the NACK, and both are used to instruct the sending node to release in time a sending buffer occupied a data packet already received by the receiving node. Optionally, based on any above described embodiment, in another embodiment, before step 703, the sending node and the receiving node further execute step 701: Initialize a network environment so as to establish a communications connection.

Optionally, based on any above described embodiment, in another embodiment, the sending node records a mapping relationship between a random sequence number and a rolling sequence number of an already sent data packet. For example, the mapping relationship may be stored in a hash table or a mapping table in another form. Further, in an embodiment, the sending node further executes step 711: Add a mapping relationship between a random sequence number and a rolling sequence number of an already sent data packet to the mapping table, so as to dynamically update the mapping table.

In the data transmission method and system provided in this embodiment of the present application, a sending node consecutively transmits data packets to a receiving node at a relatively constant transmission rate, and the receiving node immediately sends packet loss feedback information to the sending node after detecting a lost data packet, so as to request the sending node to retransmit the lost data packet. Unlike the TCP in which there is a phenomenon that a data packet cannot be sent because of a limitation such as a send window or a congestion window, in a case of an adequate memory, a mechanism in which the sending node actively "pushes" a data packet and the receiving node "pulls" a lost packet according to the "pushed" data can significantly improve a data transmission rate and bandwidth utilization. In addition, because the data packets are sent at a specific rate, a case in which data packets are instantly injected into a network can be reduced. Further, a data packet is transmitted based on double sequence numbers, so that the receiving node can quickly detect a lost data packet. Further, a releasable protocol stack memory is quickly released by adding a Release SEQ field to a NACK. Further, a problem that a receiving buffer is blocked by an HOL packet is resolved by using a periodical PACK control packet.

Figure 10:
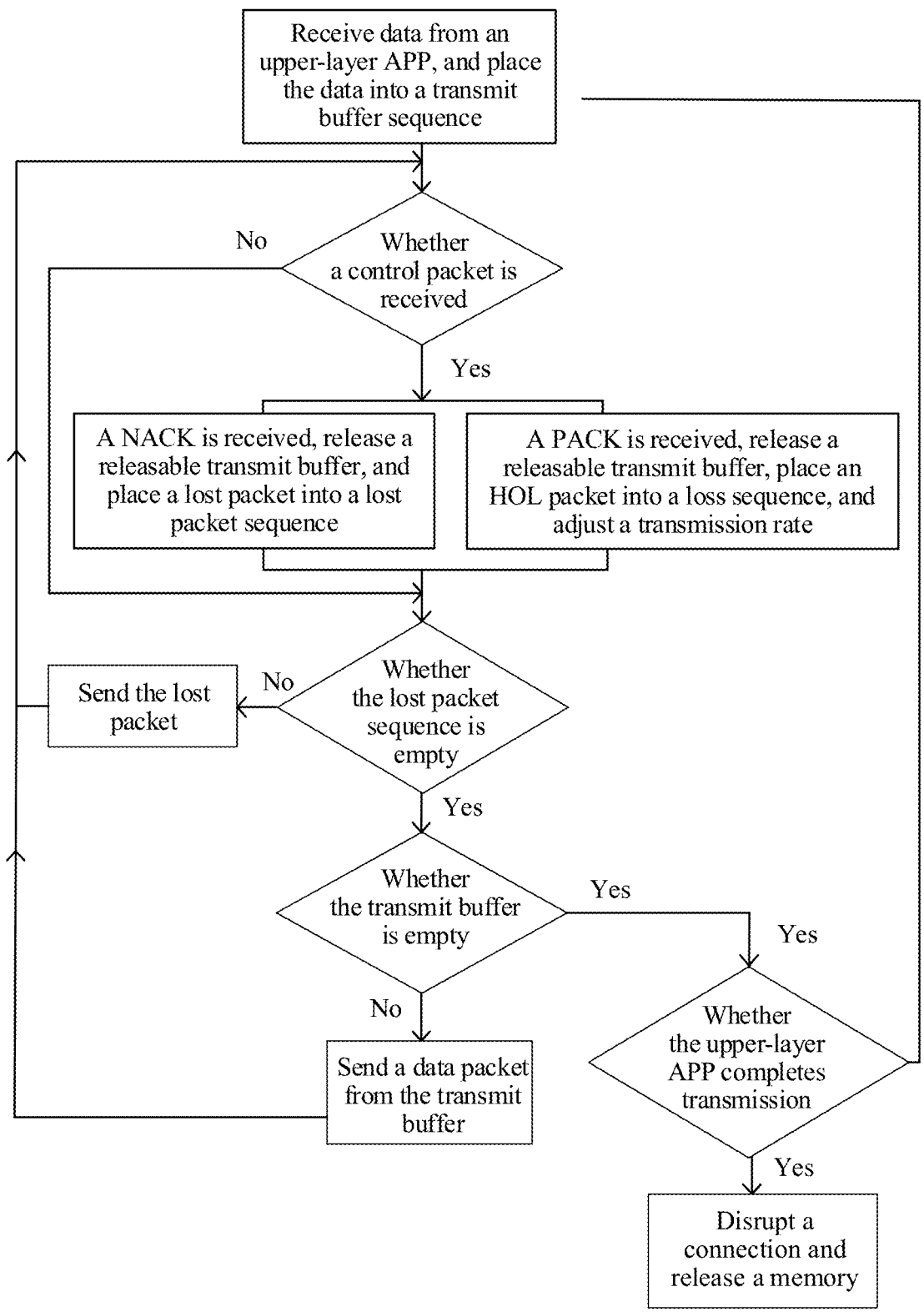
FIG. 10 is a working flowchart of a sending node according to an embodiment of the present application.

With reference to FIG. 10, the following describes a work process of a sending node in an embodiment of the present application. According to FIG. 10, the sending node encapsulates data received from an upper-layer application program, and then writes the encapsulated data to a sending buffer. When encapsulating a data packet, the sending node adds, to a header of the data packet, a random sequence number and a rolling sequence number described in the foregoing embodiments. If the sending node currently receives a NACK sent by a receiving node, the sending node releases a releasable sending buffer according to a packet loss indication field and a release field in the NACK, and adds a lost packet to a lost packet sequence. If the sending node currently receives a PACK sent by the receiving node, the sending node adjusts a transmission rate according to a data packet receiving rate and/or a data packet loss rate carried in the PACK. If the sending node currently receives neither a PACK nor a NACK, whether a lost packet sequence is empty is determined, where the lost packet sequence is used to store a data packet determined as a lost data packet by the receiving node; and if the lost packet sequence is not empty, the lost data packet in the lost packet sequence is sent; or if the lost packet sequence is empty, whether a sending buffer is empty is determined. If the sending buffer is not empty, a data packet is sent from the sending buffer according to a specific rate; or if the sending buffer is empty, whether the upper-layer application program completes transmission is determined. If the upper-layer application program completes the transmission, a connection (such as a UDP connection) established to the receiving node is disrupted, and the sending buffer is released; or if the upper-layer application program does not complete the transmission, wait to receive data from the upper-layer application program and execute the foregoing process.

Figure 11:
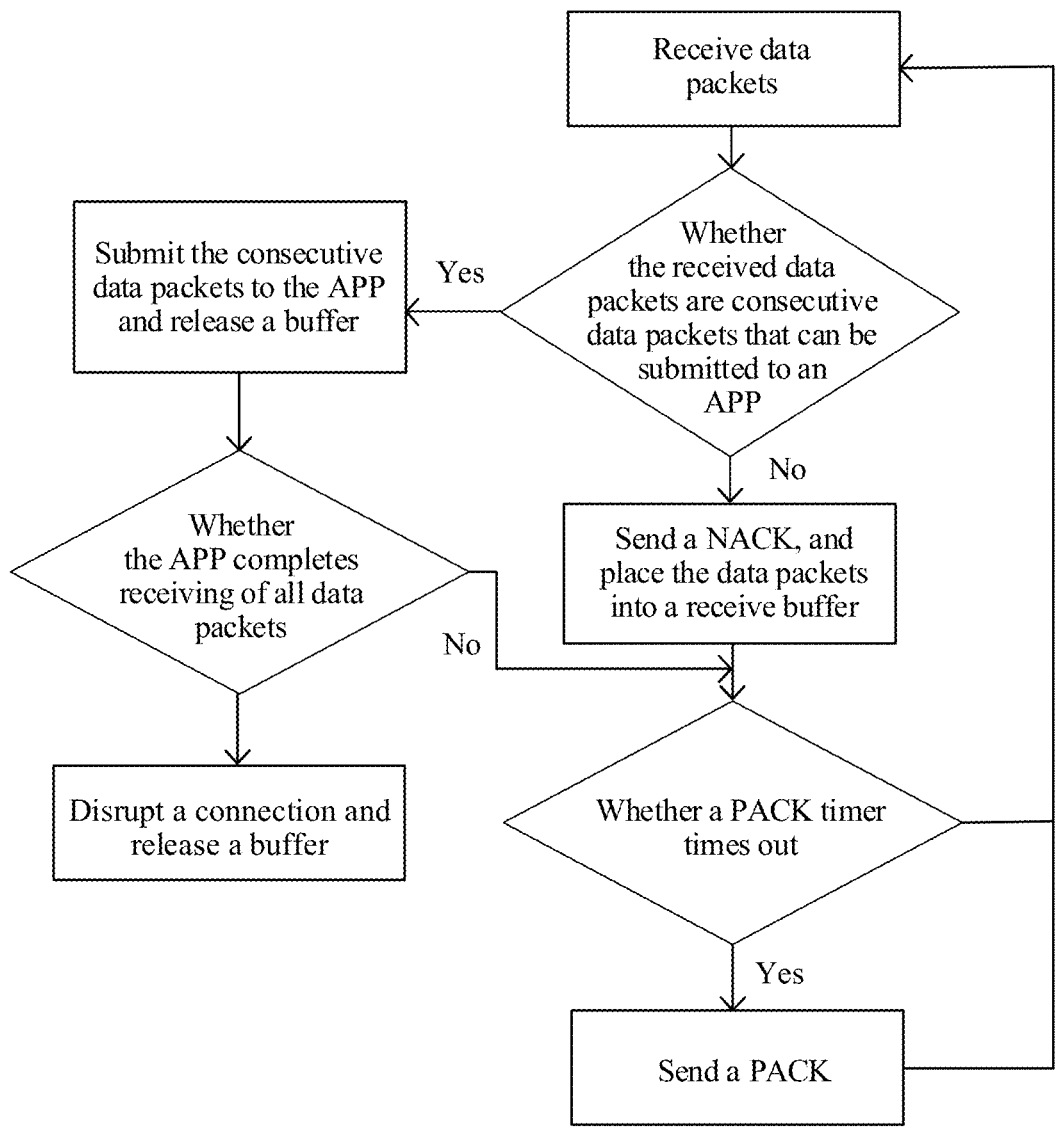
FIG. 11 is a working flowchart of a receiving node according to an embodiment of the present application.

Correspondingly, with reference to FIG. 11, the following describes a work process of a receiving node in an embodiment of the present application. According to FIG. 11, after receiving data packets, the receiving node determines whether the data packets that are already received currently are consecutive data packets that can be submitted to an application program. If the received data packets are consecutive data packets that can be submitted to an application program, the consecutive data packets are submitted to the application program, and a transmit/receiving buffer occupied by the already submitted data packets is released. If the received data packets are not consecutive data packets that can be submitted to an application program, the receiving node determines that a data packet is lost, sends a NACK to a sending node, and places the currently received data packets into a receiving buffer. The consecutive data packets herein are data packets in a consecutive transmission sequence. Further, the receiving node enables a PACK timer (which is generally enabled after the first data packet is received), and if the timer times out, the receiving node is triggered to send a PACK, reset the timer, and restart timing. If the application program completes receiving of all data packets, the receiving node disrupts a connection (such as a UDP connection) established to the sending node, and releases the receiving buffer.

In an embodiment of the present application, the above described processes in FIG. 10 and FIG. 11 may be respectively implemented by protocol stacks of the sending node and the receiving node. More specifically, in an embodiment, the processes in FIG. 10 and FIG. 11 may be implemented by acceleration protocols (Fillp) respectively deployed on the sending node and the receiving node. From a perspective of a protocol layer, the Fillp may be implemented on any layer. For example, in an embodiment, the Fillp may be located between a network layer and a physical layer, or may be located on a transport layer protocol, for example, the Fillp may be carried on the UDP. In another embodiment, the above described processes may be directly implemented by transport layer protocols (such as the UDP) in the protocol stacks of the sending node and the receiving node, and certainly, function extension needs to be performed on an existing transport layer protocol. In another embodiment, the above described processes may be respectively implemented by application programs or application program plug-ins deployed on the sending node and the receiving node.

Figure 12:
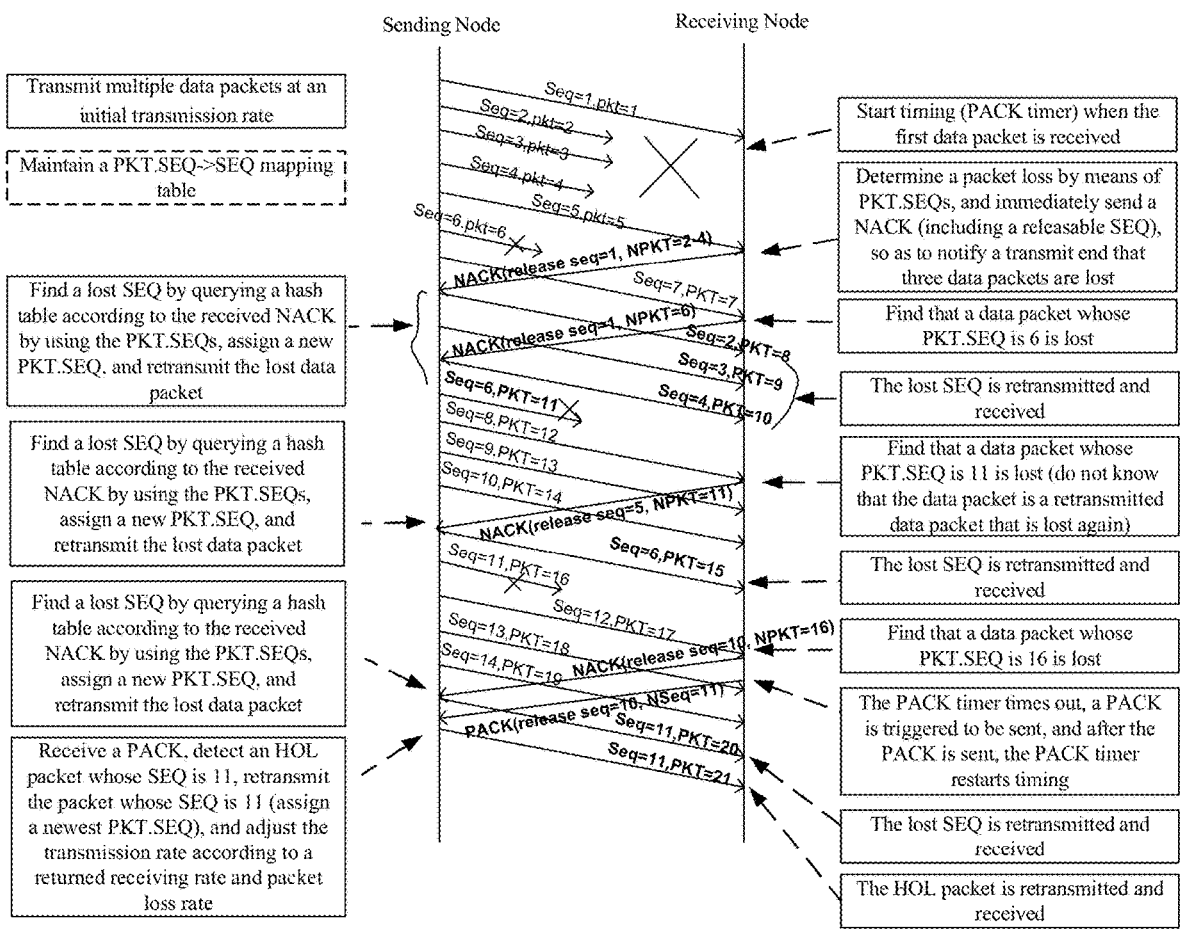
FIG. 12 is a schematic flowchart of data interaction in a data transmission system according to an embodiment of the present application.

The following demonstrates a detailed data packet sending and receiving procedure in a data transmission system in an embodiment of the present application by using an example shown in FIG. 12. According to FIG. 12, the procedure mainly includes the following steps.

Step 1: A sending node determines an initial transmission rate, and transmits multiple data packets at the initial transmission rate by using a connection (for example, a UDP connection) established to a receiving node. The sending node adds double sequence numbers (a random sequence number and a rolling sequence number PKT.SEQ, and for ease of description, in the following, the random sequence number is represented by using SEQ and the rolling sequence number is represented by using PKT) to a header of each data packet. For example, in a data packet 1, SEQ is 1 and PKT is 1; and in a data packet 2, SEQ is 2 and PKT is 2. It should be noted that for ease of understanding, in FIG. 12, assuming that each data packet carries only 1-byte data, a difference between random sequence numbers of adjacent data packets is only 1. Optionally, the sending node establishes a PKT.SEQ->SEQ hash table.

Step 2: When the receiving node receives the first data packet (PKT=1), a PACK timer starts timing.

Step 3: Data packets whose PKTs are 2, 3, and 4 are lost because of a link reason. A data packet whose SEQ is 5 and PKT is 5 is received, and in this case, the receiving node immediately returns a NACK. The NACK carries a releasable memory release SEQ=1 (the data packet whose PKT is 1 is already received), and a packet loss indication field NPKT=2 to 4 (START=2, and END=4). Herein, compared with the TCP in which a packet loss cannot be determined at this time, the receiving node may more quickly detect a lost data packet according to the rolling sequence number.

Step 4: The sending node continues to transmit a data packet, and the data packet whose SEQ is 6 and PKT is 6 is lost.

Step 5: A data packet whose SEQ is 7 and PKT is 7 is received, and the receiving node immediately sends a NACK (release SEQ=1, NPKT=6) to notify that the data packet whose PKT is 6 is lost.

Step 6: The NACK (NPKT=2 to 4) previously sent by the receiving node is received by the sending node; it is determined, according to the PKT.SEQ->SEQ mapping table already established by the sending node, that the data packets whose SEQs are 2, 3, and 4 are lost; and the sending node immediately enters a retransmission phase: extracting the data packets whose SEQs are 2, 3, and 4, assigning new PKT.SEQs to the data packets, and performing retransmission. It should be noted that PKTs corresponding to the data packets whose SEQs are 2, 3, and 4 are already changed to 8, 9, and 10, and the PKT.SEQ->SEQ mapping table is updated. Further, the sending node releases, according to the release SEQ=1 carried in the NACK, a sending buffer occupied by the data packet whose SEQ is 1.

Step 7: The receiving node receives the retransmitted data packets whose SEQs are 2, 3, and 4 and PKTs are 8, 9, and 10. Compared with the TCP in which all lost packets cannot be retransmitted at a time and only a lost packet whose sequence number is closest to an ACK number is retransmitted, in the data transmission system in this embodiment of the present application, the sending node can retransmit all determined lost packets at a moment, so that the retransmission is more efficient.

Step 8: The sending node receives the NACK (NPKT=6), and similar to the foregoing manner for processing the NACK, the data packet whose SEQ is 6 is retransmitted, where the SEQ of the retransmitted data packet is not changed, but the PKT is updated to 11.

Step 9: The sending node continues to send a data packet whose SEQ is 8 and PKT is 12; and it is assumed that the retransmitted data packet whose SEQ is 6 and PKT is 11 is lost again because of a link problem.

Step 10: When the data packet whose SEQ is 8 and PKT is 12 is received, the receiving node sends a NACK (release SEQ=5, NPKT=11) to notify the sending node that the data packet whose PKT is 11 is lost again (herein, the retransmitted packet whose SEQ is 6 is lost again).

Step 11: The sending node continues to send data packets whose SEQs are 9 and 10 and PKTs are 13 and 14, and the data packets are received by the receiving node.

Step 12: The sending node receives the NACK (release SEQ=5, NPKT=11), finds, by querying the mapping table, that the retransmitted data packet whose SEQ is 6 is lost again, and performs retransmission again, where the PKT is updated to 15. In addition, a sending buffer occupied by the data packets whose SEQs are 2 to 5 is released according to the release SEQ=5.

Step 13: The receiving node receives the data packet whose SEQ is 6 and PKT is 15 (the data packet whose SEQ is 6 is retransmitted twice in total).

Step 14: The sending node sends a data packet whose SEQ is 11 and PKT is 16 and a data packet whose SEQ is 12 and PKT is 17; and because of link quality, the data packet whose SEQ is 11 is lost.

Step 15: After receiving the data packet whose SEQ is 12 and PKT is 17, the receiving node determines that the data packet whose PKT is 16 is lost, and sends a NACK (release SEQ=10, NPKT=16).

Step 16: The sending node sends a data packet whose SEQ is 13 and PKT is 18 and a data packet whose SEQ is 14 and PKT is 19.

Step 17: The receiving node receives the data packet whose SEQ is 13 and PKT is 18. At this time, because the PACK timer times out, the receiving node sends a PACK. Because the data packet whose SEQ is 11 is missed in a receiving buffer, data in the receiving buffer is inconsecutive, the data cannot be submitted to an application program in time, and the receiving buffer cannot be released. Therefore, in the PACK, Nseq=11, so as to notify the sending node that the data packet whose SEQ is 11 is not received, where the SEQ is an SEQ of an HOL packet. After the PACK is sent, the PACK timer is reset and restarts timing.

Step 18: The sending node receives the NACK (release SEQ=10, NPKT=16), queries the mapping table, finds that the data packet whose SEQ is 11 is lost, and retransmits the data packet whose SEQ is 11, where the PKT of the retransmitted data packet is updated to 20. A sending buffer occupied by the data packets whose SEQs are 6 to 10 is released.

Step 19: The sending node receives the PACK (release SEQ=10, Nseq=11), finds that the packet whose SEQ is 11 is lost and becomes an HOL packet blocking the receiving buffer, and retransmits the data packet whose SEQ is 11 and PKT is 21. Further, the sending node adjusts the transmission rate according to receiving rate and/or data packet loss rate information carried in the PACK.

Step 20: The receiving node receives the data packet whose SEQ is 11 and PKT is 20, and further receives the data packet whose SEQ is 11 and PKT is 21, and then discards the data packet whose SEQ is 11 and PKT is 21.

It can be seen from the foregoing procedure that the packet transmission rate of the sending node is fixed, and is a constant transmission rate. Unlike TCP window transmission, a congestion problem resulting from excessive data packets instantly injected into a network is not caused. Further, compared with the TCP, in a double-sequence-number mechanism, any lost data packet can be detected within an RTT, a determining method is relatively simple, and more time is saved compared with timeout retransmission used in the TCP.

The following describes apparatuses provided by embodiments of the present application. As shown in FIG. 2, an aspect of the embodiments of the present application provides a sending node 110, which includes a processor 120, a protocol stack 130, a communications interface 140, and a storage 150. The processor 120 may specifically be a general purpose processor, a digital signal processor (DSP), an application-specific integrated circuit (ASIC), a field programmable gate array (FPGA), or another kind of programmable logical component. The storage 150 may include a computer readable storage medium, such as a magnetic storage device (such as a hard disk, a floppy disk, or a magnetic stripe), an optical storage medium (such as a digital versatile disc (DVD)), a smartcard, a flash device, a random access memory (RAM), a read-only memory (ROM), a programmable ROM (PROM), an erasable PROM (EPROM), a register, and any combination thereof. The communications interface 140 specifically includes a transmitter circuit 142 and a receiver circuit 146. The storage 150 of the sending node 110 stores an application program 121, and the application program 121 can be executed by the processor to implement a specific service function. The protocol stack 130 is generally implemented by software. For example, the protocol stack 130 is stored in the storage 150 in a form of an executable program and is executed by the processor so as to implement data processing, sending, and receiving. In some scenarios, the protocol stack 130 may be implemented by a hardware circuit or a dedicated chip, such as a field programmable gate array (FPGA) or an application-specific integrated circuit (ASIC). Specifically, in an embodiment, in a process in which the application program 121 is executed by the processor, on the one hand, an application programming interface (API) may be invoked to transmit data to the protocol stack 130. After receiving the data, the protocol stack 130 performs processing such as encapsulation on the data according to a protocol specification; and then, a hardware driver in a kernel is invoked by using a system function, so as to drive related hardware, for example, the transmitter circuit 142 sends a data packet. On the other hand, after receiving the data packet, the receiver circuit 146 reports a receiving event to the kernel under the drive of the hardware driver, and the kernel invokes the protocol stack 130 to process the data. For processes of data transmission, receiving, and processing of the protocol stack 130, refer to the work processes of the sending nodes in the embodiments shown in FIG. 3 to FIG. 12, and details are not described again. Further, the storage 150 includes a memory, and all or some space of the memory is used as a sending buffer of the protocol stack 130.

According to another aspect, referring to FIG. 2, an embodiment of the present application further provides a receiving node 20, including a protocol stack 21, a processor, a communications interface, and a storage (not shown in the figure). The communications interface specifically includes a transmitter circuit and a receiver circuit. Specific forms of the protocol stack 21, the processor, the communications interface, and the storage are similar to those of the protocol stack, the processor, the communications interface, and the storage of the sending node 110. For a related work process, refer to the description in the foregoing embodiment. Further, for data packet sending/receiving and processing processes of the protocol stack 21 of the receiving node 20, refer to the work processes of the receiving nodes in the embodiments shown in FIG. 3 to FIG. 12, and details are not described again.

Figure 13:
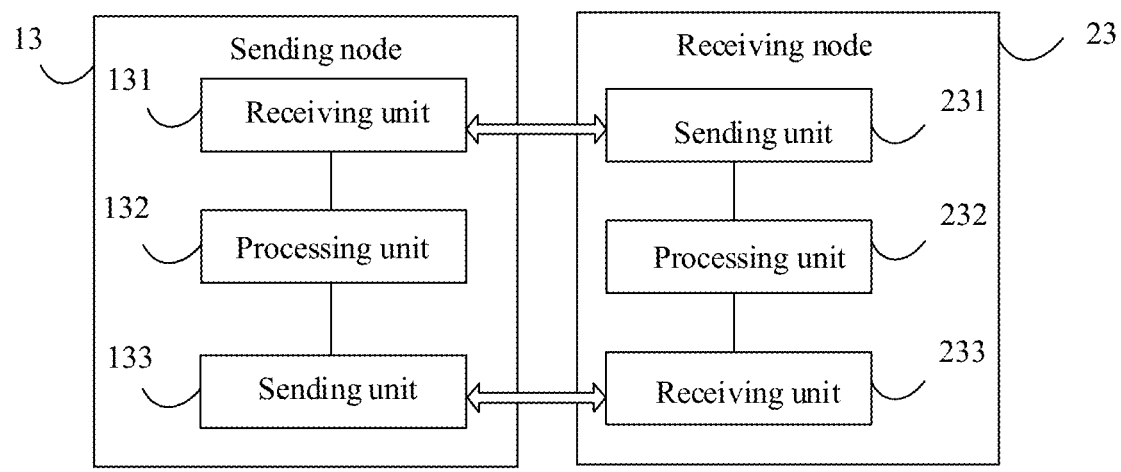
FIG. 13 is a simplified block diagram of a data transmission system according to another embodiment of the present application.

An embodiment of the present application further provides a data transmission system. As shown in FIG. 13, the data transmission system includes a sending node 13 and a receiving node 23. An application program 131 and an application program 22 respectively run on the sending node 13 and the receiving node 23.

The sending node 13 includes a sending unit 133, a processing unit 132, and a receiving unit 131. The processing unit 132 is configured to encapsulate data of the application program running on the sending node 13 into multiple data packets. The sending unit 133 is configured to transmit the multiple data packets to the receiving node at an initial transmission rate. The receiving unit 131 is configured to receive packet loss feedback information from the receiving node 23. The sending unit 133 is further configured to retransmit a lost data packet based on the received packet loss feedback information, where the retransmitted data packet carries a new rolling sequence number. The receiving node 23 includes a sending unit 231, a processing unit 232, and a receiving unit 233. The receiving unit 233 is configured to receive the multiple data packets transmitted by the sending node 13 at the initial transmission rate. The processing unit 232 is configured to: after detecting at least one lost data packet according to a rolling sequence number of a data packet received by the receiving unit 233, send packet loss feedback information to the sending node 13 by using the sending unit 231, so as to instruct the sending node 13 to retransmit the lost data packet. It should be noted that the sending unit 133, the processing unit 132, and the receiving unit 131 are further configured to cooperate to implement the functions of the sending nodes in all of the foregoing method embodiments. The sending unit 133 sends a data packet under control of the processing unit 132. The receiving unit 131 receives the data packet under control of the processing unit 132. The processing unit 132 is further configured to determine a lost data packet according to a received control packet, and control the sending unit to retransmit the data packet. Optionally, the processing unit may further adjust the data transmission rate according to a control packet received by the receiving unit 131. Correspondingly, the sending unit 231, the processing unit 232, and the receiving unit 233 are further configured to cooperate to implement the functions of the receiving nodes in all of the foregoing method embodiments. Function division of each unit is similar to that of the sending node 13, or another division manner commonly used by a person skilled in the art is used.

A person of ordinary skill in the art may understand that all or some of the steps of the methods in the embodiments may be implemented by a program instructing relevant hardware (such as a processor). The program may be stored in a computer readable storage medium. The storage medium may include: a ROM, a RAM, a magnetic disk, or an optical disc. A term "program" used in the embodiments of the present application is widely understood as and includes but is not limited to: an instruction, an instruction set, code, a code segment, a subprogram, a software module, an application, a software package, a thread, a process, a function, firmware, middleware, or the like.

The foregoing describes in detail the packet transmission method, the system, the user equipment, and the server that are provided in the embodiments of the present application. In this specification, specific examples are used to describe the principle and implementation manners of the present application, and the description of the embodiments is only intended to help understand the method and core idea of the present application. In addition, a person of ordinary skill in the art may, based on the idea of the present application, make modifications with respect to the specific implementation manners and the application scope. Therefore, the content of this specification shall not be construed as a limitation to the present application.

What is claimed is:

1. A method for transmitting data between a sending node and a receiving node, comprising:

transmitting, by the sending node, a plurality of data packets to the receiving node at an initial transmission rate, wherein each data packet carries a random sequence number (SEQ) and a rolling sequence number (PKT.SEQ), the random sequence number uniquely identifies the data packet, and the rolling sequence number indicates a transmission sequence of the data packet;

receiving, by the sending node, a packet loss feedback from the receiving node, wherein the packet loss feedback is generated after the receiving node detects a packet loss event according to a rolling sequence number of a received data packet, and wherein the packet loss feedback comprises information of a random sequence number or a rolling sequence number of a lost data packet;

determining, by the sending node, the lost data packet based on the received packet loss feedback;

generating, by the sending node, a replacement data packet by replacing the rolling sequence number of the lost data packet with a new rolling sequence number; and transmitting, by the sending node, the replacement data packet, wherein the replacement data packet carries a same random sequence number as the lost data packet, and carries the new rolling sequence number that is different from the rolling sequence number of the lost packet;

wherein the packet loss feedback is a negative acknowledge (NACK) control packet having a packet loss indication field, and the packet loss indication field carries information of the rolling sequence number of the lost data packet and wherein determining the lost data packet based on the received packet loss feedback comprises:

determining, by the sending node, the random sequence number of the lost data packet based on the information of the rolling sequence number carried in the received NACK control packet and a mapping relationship between the random sequence number and the rolling sequence number of the lost data packet.

2. The method according to claim 1, wherein multiple consecutive data packets are lost in the packet loss event;

wherein the packet loss indication field comprises a packet loss start field (START) and a packet loss end field (END), and the packet loss start field and the packet loss end field carry information of rolling sequence numbers of the first packet and the last packet of the multiple consecutive data packets that are lost, respectively.

3. The method according to claim 1, wherein the NACK control packet further comprises a release field, and the release field carries information of a random sequence number or a rolling sequence number of a data packet that is currently received by the receiving node.

4. The method according to claim 3, further comprising:
releasing, by the sending node, the data packet that is received currently by the receiving node from a sending buffer.

5. The method according to claim 1, further comprising:
receiving, by the sending node, a period acknowledge (PACK) control packet; and
retransmitting, by the sending node, a data packet corresponding to a random sequence number carried in the PACK control packet;
wherein the random sequence number carried in the PACK control packet is a random sequence number of a data packet that is missing in a receiving buffer of the receiving node, and the missing data packet is a lost data packet not sensed by the sending node, or a data packet lost again after being retransmitted.

6. The method according to claim 5, wherein the PACK control packet further carries a data packet receiving rate or a data packet loss rate; and wherein the method further comprises:
adjusting, by the sending node, the initial transmission rate according to the data packet receiving rate or the data packet loss rate.

7. A data sending device, comprising:
a processor, a memory, and a communications interface configured to communicate with a data receiving device, wherein the communications interface comprises a transmitter and a receiver;
wherein the transmitter is configured to:
transmit a plurality of data packets to the data receiving device at an initial transmission rate, wherein each data packet carries a random sequence number (SEQ) and a rolling sequence number (PKT.SEQ), the random sequence number uniquely identifies the data packet, and the rolling sequence number indicates a transmission sequence of the data packet;
wherein the receiver is configured to:
receive a packet loss feedback from the data receiving device, wherein the packet loss feedback is generated after the data receiving device detects a packet loss event according to a rolling sequence number of a received data packet; wherein the packet loss feedback is a negative acknowledge (NACK) control packet having a packet loss indication field, and the packet loss indication field carries information of a rolling sequence number of a lost data packet;
wherein the processor is configured to:
determine a random sequence number of the lost data packet based on the information of the rolling sequence number carried in the received NACK control packet and a mapping relationship between the random sequence number and the rolling sequence number of the lost data packet;
generating a replacement data packet by replacing the rolling sequence number of the lost data packet with a new rolling sequence number; and wherein the transmitter is further configured to:
transmit the replacement data packet, wherein the replacement data packet carries a same random sequence number as the lost data packet, and carries the new rolling sequence number different from the rolling sequence number of the lost packet.

8. The data sending device according to claim 7, wherein multiple consecutive data packets are lost in the packet loss event; wherein the packet loss indication field comprises a packet loss start field (START) and a packet loss end field (END), and the packet loss start field and the packet loss end field carry information of rolling sequence numbers of the first packet and the last packet of the multiple consecutive data packets that are lost, respectively.

9. The data sending device according to claim 7, wherein the NACK control packet further comprises a release field, and the release field carries information of a random sequence number or a rolling sequence number of a data packet that is currently received by the data receiving device.

10. The data sending device according to claim 9, wherein all or part of the memory is used as a sending buffer; and wherein the processor is further configured to:
release, from the sending buffer the data packet that is currently received by the data receiving device.

11. The data sending device according to claim 7, wherein the receiver is further configured to:
receive a period acknowledge (PACK) control packet; and
wherein the transmitter is further configured to:
retransmit a data packet corresponding to a random sequence number carried in the PACK control packet;
wherein the random sequence number carried in the PACK control packet is a random sequence number of a data packet that is missing in a receiving buffer of the data receiving device, and the missing data packet is a lost data packet not sensed by the data sending device, or a data packet lost again after being retransmitted.

12. The data sending device according to claim 11, wherein the PACK control packet further carries a data packet receiving rate or a data packet loss rate; and wherein the processor is further configured to:
adjust the initial transmission rate according to the data packet receiving rate or the data packet loss rate.

13. A non-transitory computer-readable storage medium storing program instructions for use by a data sending device, wherein when executed, the instructions cause the data sending device to perform a process that comprises:
transmitting a plurality of data packets to a data receiving device at an initial transmission rate, wherein each data packet carries a random sequence number (SEQ) and a rolling sequence number (PKT.SEQ), the random sequence number uniquely identifies the data packet, and the rolling sequence number indicates a transmission sequence of the data packet;
receiving a packet loss feedback from the data receiving device, wherein the packet loss feedback is generated after the data receiving device detects a packet loss event according to a rolling sequence number of a received data packet; and wherein the packet loss feedback comprises information of a random sequence number or a rolling sequence number of a lost data packet;
determining the lost data packet based on the received packet loss feedback;
generating a replacement data packet by replacing the rolling sequence number of the lost data packet with a new rolling sequence number; and transmitting the replacement data packet, wherein the replacement data packet carries a same random sequence number as the lost data packet, and carries the new rolling sequence number different from the rolling sequence number of the lost packet;

wherein the packet loss feedback is a negative acknowledge (NACK) control packet, the NACK control packet having a packet loss indication field, and the packet loss indication field carries information of the rolling sequence number of the lost data packet and wherein determining the lost data packet based on the received packet loss feedback comprises:

determining the random sequence number of the lost data packet based on the information of the rolling sequence number carried in the received NACK control packet and a mapping relationship between the random sequence number and the rolling sequence number of the lost data packet.

14. The non-transitory computer-readable storage medium according to claim 13, wherein the NACK control packet further comprises a release field, and the release field carries information of a random sequence number or a rolling sequence number of a data packet that is currently received by the data receiving device.

15. The non-transitory computer-readable storage medium according to claim 13, wherein the instructions further cause the data sending device to perform the following steps:

receiving a period acknowledge (PACK) control packet; and retransmitting a data packet corresponding to a random sequence number carried in the PACK control packet;

wherein the random sequence number carried in the PACK control packet is a random sequence number of a data packet that is missing in a receiving buffer of the data receiving device, and the missing data packet is a lost data packet not sensed by the data sending device, or a data packet lost again after being retransmitted.

16. The non-transitory computer-readable storage medium according to claim 15, wherein the PACK control packet further carries a data packet receiving rate or a data packet loss rate; and wherein the instructions further cause the data sending device to adjust the initial transmission rate according to the data packet receiving rate or the data packet loss rate.

* * * * *